US012694598B2

(12) United States Patent
Wang et al.

(10) Patent No.: US 12,694,598 B2
(45) Date of Patent: Jul. 28, 2026

(54) DISPLAY METHOD AND ELECTRONIC DEVICE

(71) Applicant: HUAWEI TECHNOLOGIES CO., LTD., Shenzhen (CN)

(72) Inventors: Min Wang, Shenzhen (CN); Shuai Zhou, Shenzhen (CN); Xu Chen, Hangzhou (CN); Bing Xie, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 18/521,562

(22) Filed: Nov. 28, 2023

(65) Prior Publication Data

US 2024/0095990 A1      Mar. 21, 2024

Related U.S. Application Data

(63) Continuation of application No. PCT/CN2022/085350, filed on Apr. 6, 2022.

(30) Foreign Application Priority Data

May 29, 2021   (CN) ......................... 202110596006.X

(51) Int. Cl.
*G06T 13/80* (2011.01)
*G06F 9/451* (2018.01)

(52) U.S. Cl.
CPC .............. *G06T 13/80* (2013.01); *G06F 9/451* (2018.02)

(58) Field of Classification Search
CPC ..... G06T 13/80; G06T 2200/24; G06T 3/048; G06T 9/451; G06F 3/048; G06F 9/451
See application file for complete search history.

(56) References Cited

U.S. PATENT DOCUMENTS

2009/0007017 A1      1/2009  Anzures et al.

FOREIGN PATENT DOCUMENTS

| CN | 105549820 A | 5/2016 |
|----|-------------|--------|
| CN | 304705503 S | 6/2018 |
| CN | 110162343 A | 8/2019 |
| EP | 3324278 A1 | 5/2018 |

*Primary Examiner* — Antonio A Caschera

(57) ABSTRACT

A display method and an electronic device provide icon animation and starting window image decoding that can be performed in parallel. After a launch operation is detected, an application launch animation may start to be displayed, thus reducing waiting latency and improving user experience.

18 Claims, 22 Drawing Sheets

904

DISPLAY METHOD AND ELECTRONIC DEVICE

CROSS-REFERENCE TO RELATED APPLICATIONS

This application is a continuation of International Application No. PCT/CN2022/085350 filed on Apr. 6, 2022, which claims priority to Chinese Patent Application No. 202110596006.X filed on May 29, 2021. The disclosures of the aforementioned applications are hereby incorporated by reference in their entireties.

TECHNICAL FIELD

Embodiments of this disclosure relate to the field of terminal technologies, and in particular, to a display method and an electronic device.

BACKGROUND

In an application launch process, an electronic device (for example, a mobile phone or a tablet) displays an application icon and an application window based on a preset animation, to provide a better visual effect of application launch for a user.

For example, on an interface 101 shown in FIG. 1(a), after detecting an operation of tapping a Gallery icon 11 by a user, an electronic device determines and draws window content of a first to-be-displayed interface. After drawing of the window content of the first to-be-displayed interface is completed, the electronic device starts to display an application launch animation. For example, an icon animation is displayed first, for example, an icon is zoomed in for display. On an interface 102 shown in FIG. 1(b), an icon indicated by a reference numeral 12 is an icon display effect at a specific moment in an animation process in which the icon is zoomed in. Then, a window (that is, a window of the first to-be-displayed interface) animation starts to be displayed, for example, the window is zoomed in for display. On an interface 103 shown in FIG. 1(c), a window indicated by a reference numeral 13 is a window display effect at a specific moment in a window animation process. After displaying of a window animation is completed, the electronic device displays an interface 104 shown in FIG. 1(d), that is, displays a Gallery window in a full-screen manner.

It can be learned that in the foregoing process that the electronic device may display the application launch animation only after the drawing of the window content of the first to-be-displayed interface is completed. If it takes a long time to draw the window content, the user cannot immediately see the launch animation after tapping the application icon. In other words, a response delay occurs, which affects user experience. Based on this, Google proposes a Starting Window mechanism in which an image is preset in the electronic device, and before the drawing of the window content of the first to-be-displayed interface is completed, the image is used as launch animation content and is connected to the icon animation, to reduce the response delay.

However, because in the Starting Window mechanism the preset image needs to be decoded before being displayed, a specific delay is also generated and optimal application launch experience cannot be provided for the user.

SUMMARY

To resolve the foregoing technical problems, this disclosure provides a display method and an electronic device.

According to a technical solution provided in this disclosure, an icon animation and starting window image decoding may be performed in parallel. After a launch operation of a user is detected, an application launch animation may start to be displayed. This reduces a waiting latency and improves user experience.

To achieve the foregoing technical objective, embodiments provide the following technical solutions.

According to a first aspect, a display method is provided, and the display method is applied to an electronic device. The method includes: receiving an application launch instruction from a user; in response to the application launch instruction, displaying an icon animation corresponding to an application, and drawing a starting window corresponding to the application, where the icon animation starts to be displayed before drawing of the starting window is completed; and after the drawing of the starting window is completed, displaying a starting window animation corresponding to the application.

The launch instruction of the user instructs the electronic device to launch a corresponding application, for example, the launch instruction of the user may include an operation of tapping an application icon on a display.

In some embodiments, after receiving the application launch instruction of the user, the electronic device starts to display the application icon animation and draw the starting window. In this case, in a process of drawing the starting window, the user may see the application icon animation.

In this way, after receiving the application launch instruction of the user, the electronic device may start to display an application icon launch animation without waiting until drawing of the starting window is completed. This can effectively reduce a user operation response delay and improve user experience.

According to any one of the first aspect or the foregoing implementations of the first aspect, before the displaying an icon animation corresponding to an application and drawing a starting window corresponding to the application, the method further includes: determining that the application is configured with a starting window mechanism.

In some embodiments, after determining that an application launch animation needs to be displayed, the electronic device needs to determine whether the application is configured with the starting window mechanism, to determine whether a response delay caused by drawing the starting window in an application launch process needs to be improved.

For example, after detecting an application launch operation by using a desktop (for example, a launcher), the electronic device sends the application launch operation to a SystemServer (SystemServer), and determines, by using a switch configuration module in a performance optimization system in the SystemServer, whether the application launch animation is enabled. If the application launch animation is enabled, it is determined that the application launch animation is allowed to be displayed in the application launch process. Then, the electronic device queries, by using an activity recording module in a WMS, an application starting window identifier recorded in a learning module in the performance optimization system, to determine whether the to-be-launched application is configured with the starting window mechanism, and whether an image corresponding to the starting window is preset. For example, a preset table is stored in the learning module, and an identifier indicating whether an application installed in the electronic device is configured with the starting window mechanism is recorded in the preset table, to determine, based on the identifier, whether the application is configured with the starting window mechanism.

In this way, after determining that the application is configured with the starting window mechanism, the electronic device may draw the starting window in response to the application launch instruction, and display the application icon animation. This avoids a response delay caused by waiting for a main interface to be drawn.

According to any one of the first aspect or the foregoing implementations of the first aspect, the in response to the application launch instruction, displaying an icon animation corresponding to an application, and drawing a starting window corresponding to the application includes: in response to the application launch instruction, the electronic device obtains icon data of the application by using a window manager service, and displays, based on the icon data, the icon animation corresponding to the application; and in response to the application launch instruction, the electronic device obtains a starting window data packet by using a starting window processing module, and draws the starting window based on the starting window data packet.

In this way, based on the starting window mechanism, in response to the application launch operation, the application icon animation is displayed when the preset starting window image is drawn, to ensure that the application launch animation may be displayed after the application launch operation is detected. This further reduces the response delay and improves user experience.

According to any one of the first aspect or the foregoing implementations of the first aspect, a waiting time period for displaying the application icon animation is preset, and the preset waiting time period for displaying the application icon animation is less than a time period for drawing the starting window, to ensure that the application icon animation may start to be displayed before drawing of the starting window is completed.

Based on this, after detecting the application launch operation, the electronic device starts to display the application icon animation after waiting for the preset waiting time period for displaying the application icon animation. In addition, after detecting the application launch operation, the electronic device starts to draw the starting window.

In this way, the electronic device reduces the waiting time period for drawing the starting window, and prevents the user from watching the application icon animation for a long time period. This improves user experience.

According to any one of the first aspect or the foregoing implementations of the first aspect, the drawing a starting window includes: obtaining the starting window data packet, decompressing the starting window data packet, obtaining preset starting window data in the starting window data packet, and drawing the starting window by using the starting window data. Alternatively, the preset starting window image is obtained and drawing of the starting window is completed.

According to any one of the first aspect or the foregoing implementations of the first aspect, the method further includes: in response to the application launch instruction, drawing a main interface corresponding to the application.

According to any one of the first aspect or the foregoing implementations of the first aspect, after the displaying a starting window animation corresponding to the application, the method further includes: displaying a main interface.

In this way, in response to the application launch instruction, the electronic device may start to draw content of the main interface of the application. The main interface is an interface corresponding to a first image frame to be displayed after the application launch animation. After determining that drawing and composing of the main interface are completed, the electronic device may end display of the launch animation, start to display the main interface of the application, and complete the application launch process.

In other words, in a process of drawing the main interface, the application icon animation and the starting window animation are displayed. This avoids a user operation response delay caused by waiting for the main interface to be drawn.

According to any one of the first aspect or the foregoing implementations of the first aspect, the application launch instruction includes an instruction corresponding to an operation of tapping an icon of the application, or a voice instruction for launching the application by using a voice.

According to a second aspect, an electronic device is provided. The electronic device includes a processor, a memory, and a display. The memory, the display, and the processor are coupled. The memory is configured to store computer program code. The computer program code includes computer instructions. When the processor reads the computer instructions from the memory, the electronic device performs the following operations: receiving an application launch instruction from a user; in response to the application launch instruction, displaying an icon animation corresponding to an application and drawing a starting window corresponding to the application, where the icon animation starts to be displayed before drawing of the starting window is completed; and after the drawing of the starting window is completed, displaying a starting window animation corresponding to the application.

According to the second aspect, before the displaying an icon animation corresponding to an application and drawing a starting window corresponding to the application, the electronic device further performs: determining that the application is configured with a starting window mechanism.

According to any one of the second aspect or the foregoing implementations of the second aspect, in response to the application launch instruction, an icon animation corresponding to an application is displayed, and drawing a starting window corresponding to the application includes: in response to the application launch instruction, the electronic device obtains icon data of the application by using a window manager service, and displays, based on the icon data, the icon animation corresponding to the application; and in response to the application launch instruction, the electronic device obtains a starting window data packet by using a starting window processing module, and draws the starting window based on the starting window data packet.

According to any one of the second aspect or the foregoing implementations of the second aspect, a waiting time period for displaying the application icon animation is preset, and the preset waiting time period for displaying the application icon animation is less than a time period for drawing the starting window, to ensure that the application icon animation may start to be displayed before drawing of the starting window is completed.

According to any one of the second aspect or the foregoing implementations of the second aspect, the drawing a starting window includes: obtaining the starting window data packet, decompressing the starting window data packet, obtaining preset starting window data in the starting window data packet, and drawing the starting window by using the starting window data. Alternatively, the preset starting window image is obtained and drawing of the starting window is completed.

According to any one of the second aspect or the foregoing implementations of the second aspect, the electronic device further performs: in response to the application launch instruction, drawing a main interface corresponding to the application.

According to any one of the second aspect or the foregoing implementations of the second aspect, after displaying a starting window animation corresponding to the application, the electronic device further performs: displaying the main interface.

According to any one of the second aspect or the foregoing implementations of the second aspect, the application launch instruction includes an instruction corresponding to an operation of tapping an icon of the application, or a voice instruction for launching the application by using a voice.

For technical effects corresponding to any one of the second aspect or the implementations of the second aspect, refer to technical effects corresponding to any one of the first aspect or the implementations of the first aspect. Details are not described herein again.

According to a third aspect, an embodiment provides an electronic device. The electronic device has a function of implementing the display method according to any one of the first aspect and the possible implementations of the first aspect. The function may be implemented by hardware, or may be implemented by hardware executing corresponding software. The hardware or the software includes one or more modules corresponding to the function.

For technical effects corresponding to any one of the third aspect or the implementations of the third aspect, refer to technical effects corresponding to the first aspect and any implementation of the first aspect. Details are not described herein again.

According to a fourth aspect, a computer-readable storage medium is provided. The computer readable storage medium stores a computer program (which may also be referred to as instructions or code). When the computer program is executed by an electronic device, the electronic device is enabled to perform the method in any one of the first aspect or the implementations of the first aspect.

For technical effects corresponding to any one of the fourth aspect or the implementations of the fourth aspect, refer to technical effects corresponding to any one of the first aspect or the implementations of the first aspect. Details are not described herein again.

According to a fifth aspect, an embodiment provides a computer program product. When the computer program product is run on an electronic device, the electronic device is enabled to perform the method according to any one of the first aspect or the implementations of the first aspect.

For technical effects corresponding to any one of the fifth aspect or the implementations of the fifth aspect, refer to technical effects corresponding to any one of the first aspect or the implementations of the first aspect. Details are not described herein again.

According to a sixth aspect, an embodiment provides a circuit system. The circuit system includes a processing circuit configured to perform the method according to any one of the first aspect or the implementations of the first aspect.

For technical effects corresponding to any one of the sixth aspect or the implementations of the sixth aspect, refer to technical effects corresponding to any one of the first aspect or the implementations of the first aspect. Details are not described herein again.

According to a seventh aspect, an embodiment provides a chip system including at least one processor and at least one interface circuit. The at least one interface circuit is configured to perform a transceiver function and to send instructions to the at least one processor. When the at least one processor executes the instructions, the at least one processor performs the method according to any one of the first aspect or the implementations of the first aspect.

For technical effects corresponding to any one of the seventh aspect or the implementations of the seventh aspect, refer to technical effects corresponding to any one of the first aspect or the implementations of the first aspect. Details are not described herein again.

DESCRIPTION OF EMBODIMENTS

Figure 1A:
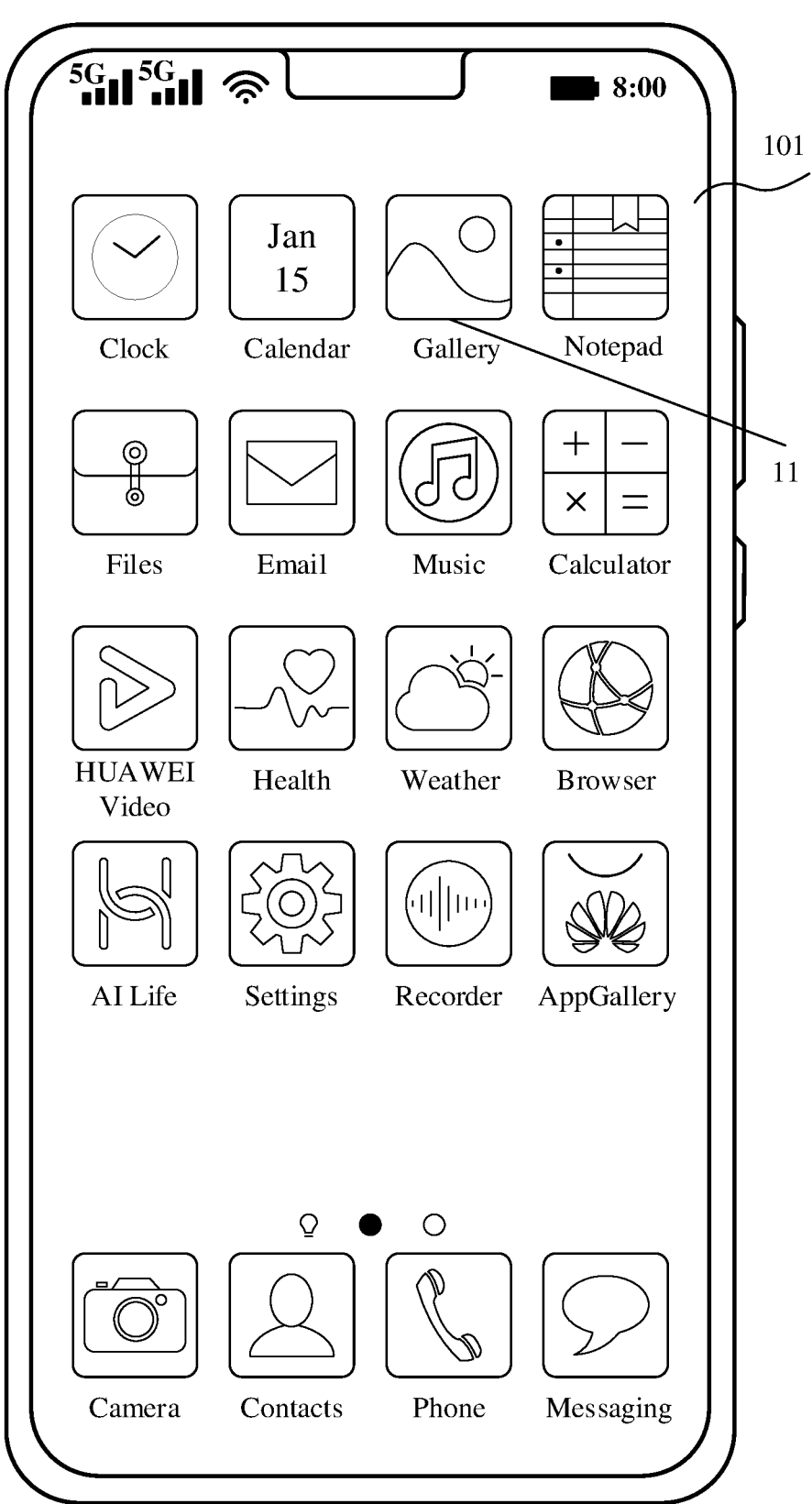
FIG. 1(a) to FIG. 1(d) are a schematic diagram 1 of an interface according to an embodiment.
Figure 1B:
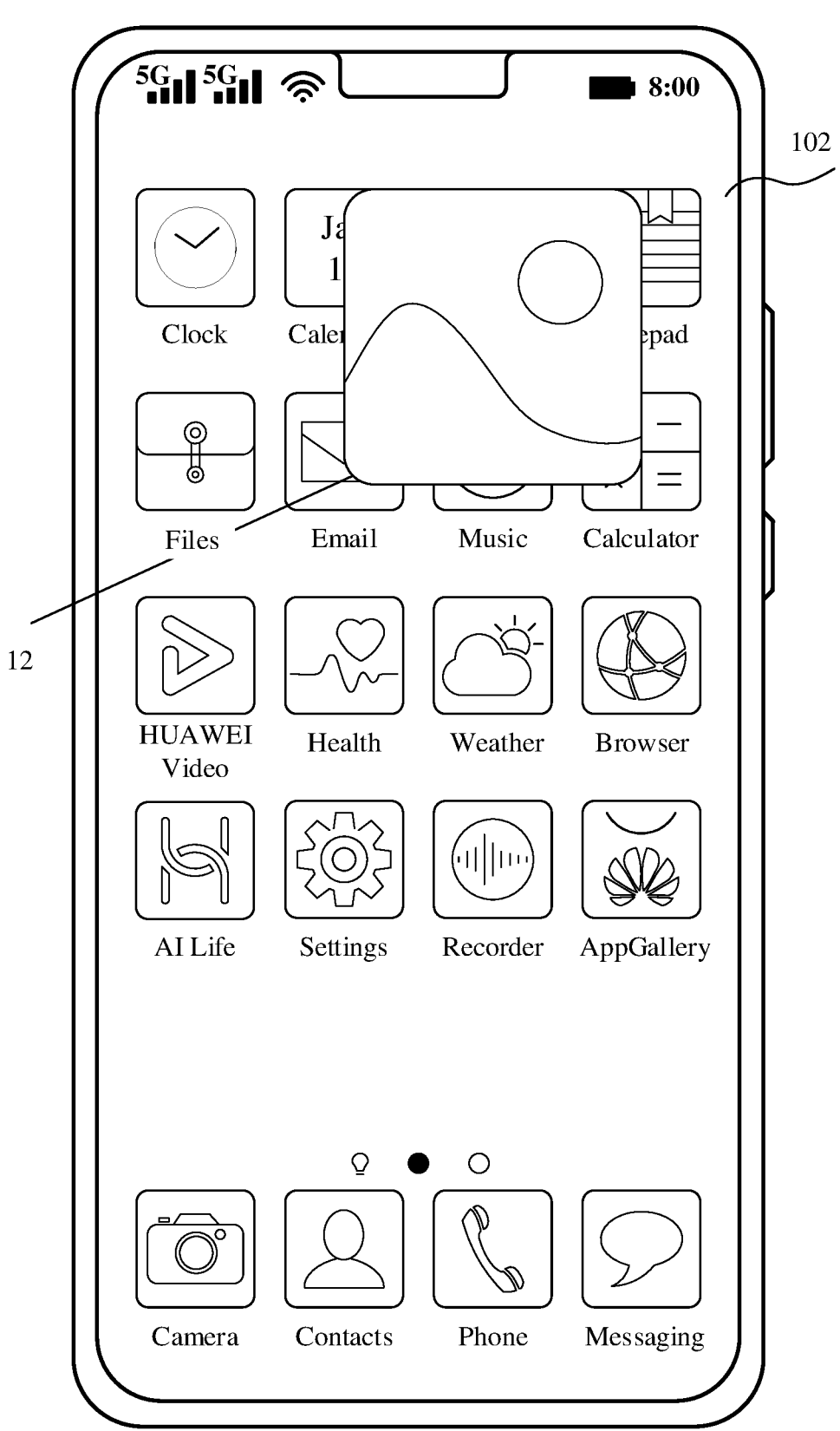
Figure 1C:
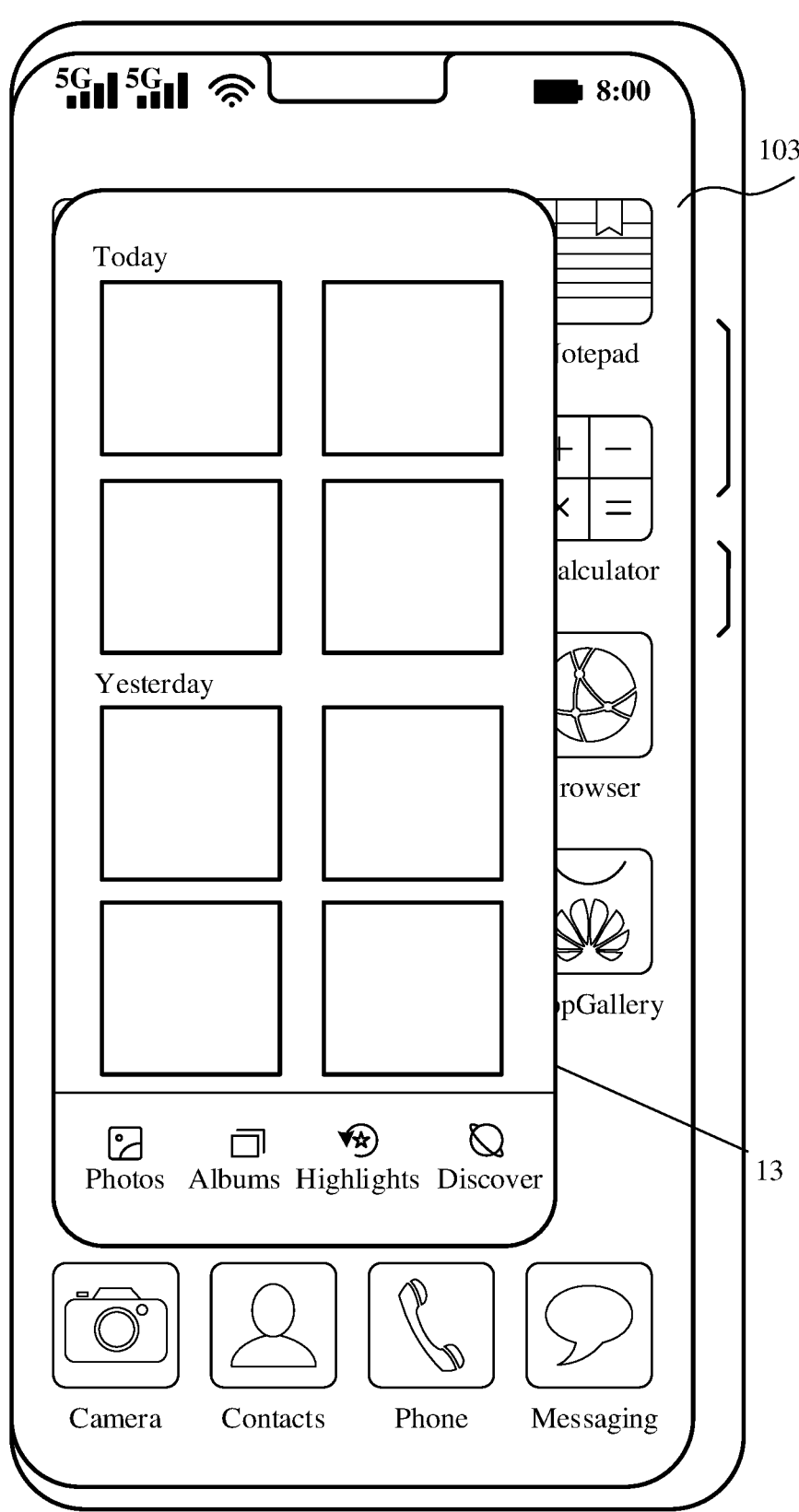
Figure 1D:
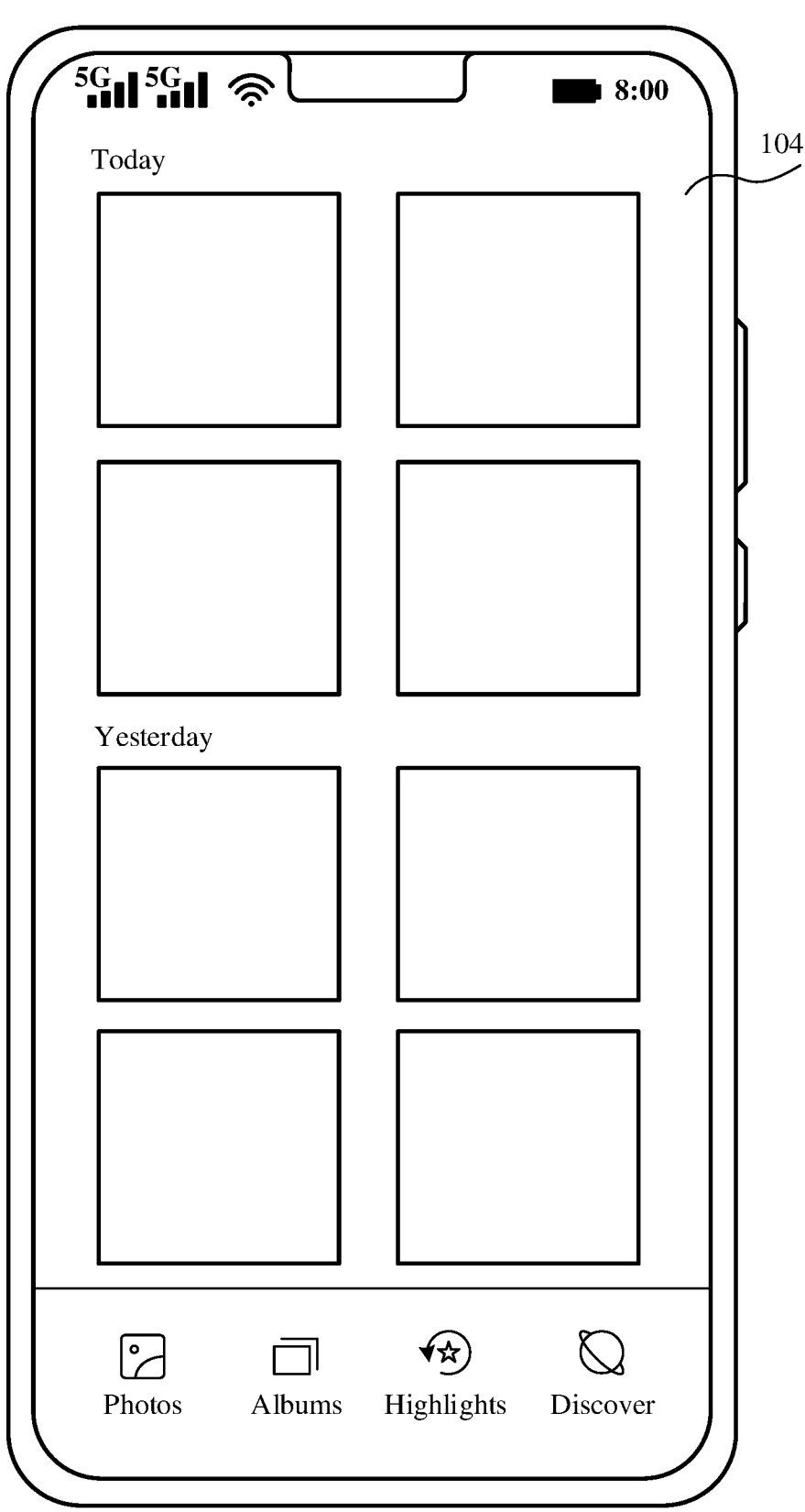

The following describes the technical solutions in embodiments of this disclosure with reference to the accompanying drawings. In the descriptions of embodiments, terms used in the following embodiments are merely intended to describe purposes of specific embodiments, but are not intended to limit this disclosure. The terms "one", "a", "the", "the foregoing", "this", and "the one" of singular forms used in this specification and the appended claims are intended to include forms such as "one or more", unless otherwise specified in the context clearly. It should be further understood that in the following embodiments that "at least one" and "one or more" mean one or at least two (including two).

Reference to "an embodiment", "some embodiments", or the like described in this specification indicates that one or more embodiments include a specific feature, structure, or characteristic described with reference to the embodiments. Therefore, statements such as "in an embodiment", "in some embodiments", "in some other embodiments", and "in other embodiments" that appear at different places in this specification do not necessarily mean reference to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner. The term "connection" includes a direct connection and an indirect connection, unless otherwise stated. "First" and "second" are merely intended for a purpose of description, and shall not be understood as an indication or implication of relative importance or implicit indication of the number of indicated technical features.

In embodiments of this disclosure, the word "example", "for example", or the like is used to represent giving an example, an illustration, or a description. Any embodiment or design scheme described as "example" or "for example" in embodiments of this disclosure should not be explained as being more preferred or having more advantages than another embodiment or design scheme. In this regard, use of the word "example", "for example", or the like is intended to present a relative concept in a specific manner.

In some scenarios, a preset application launch animation in an electronic device includes two parts of animation elements: one part is an application icon animation, and the other part is completed drawing of an application window animation. After detecting an application launch operation of a user, the electronic device draws content of a first display interface corresponding to the application, and starts to display a launch animation after drawing of the content of the first display interface is completed. Because the electronic device may start to display the launch animation only after drawing of the window is completed, the user may not learn, within a time period after the launch operation is performed to launch the application, whether the launch operation takes effect. In other words, the electronic device generates a launch response delay, which affects user experience.

Based on this, Google proposes a Starting Window mechanism in which an image is preset for the application in the electronic device, and before the drawing of the first to-be-displayed display interface of the application is completed, an animation of the preset image is displayed to reduce a display delay.

Figure 2A:
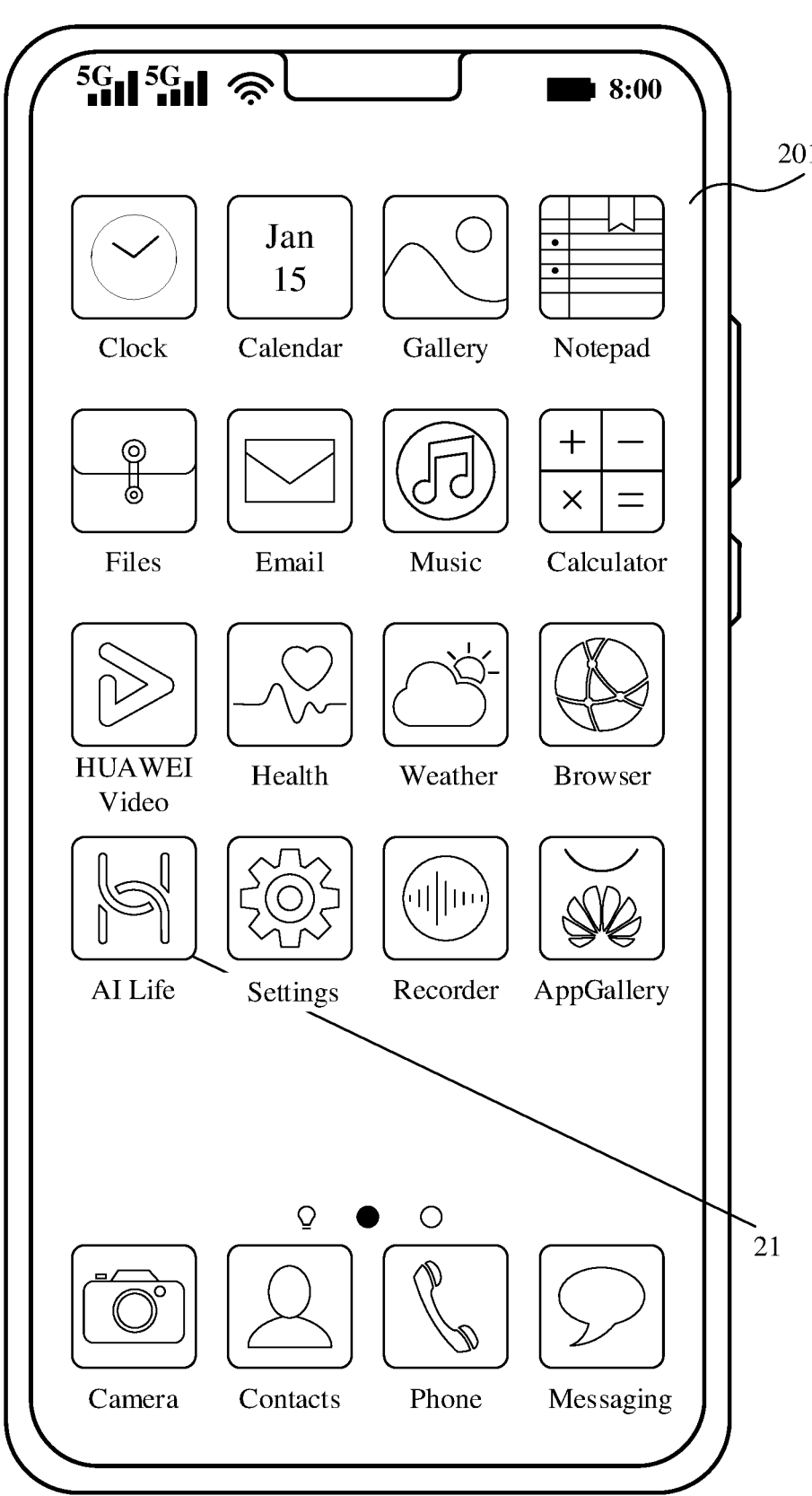
FIG. 2(a) to FIG. 2(e) are a schematic diagram 2 of an interface according to an embodiment.
Figure 2B:
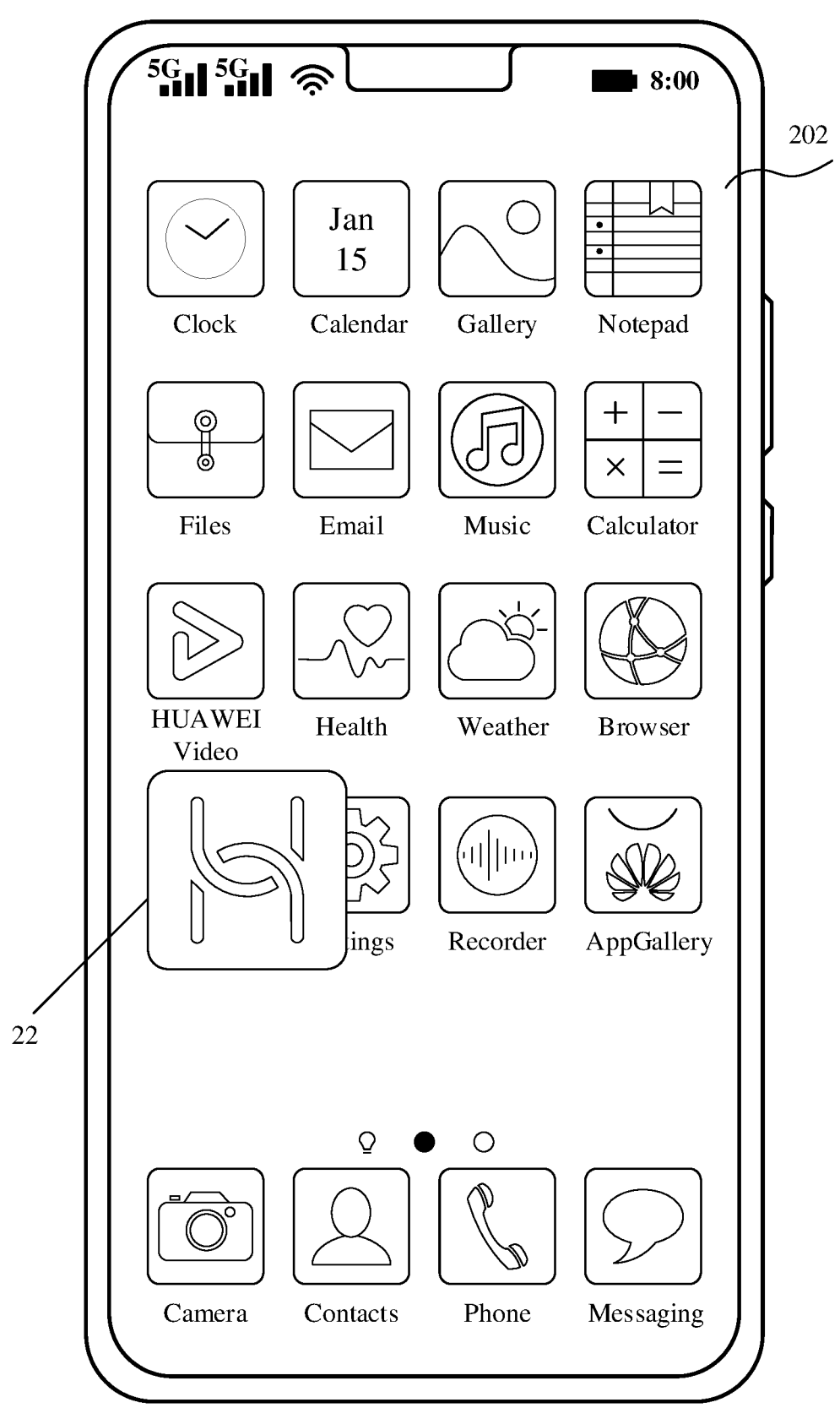
Figure 2C:
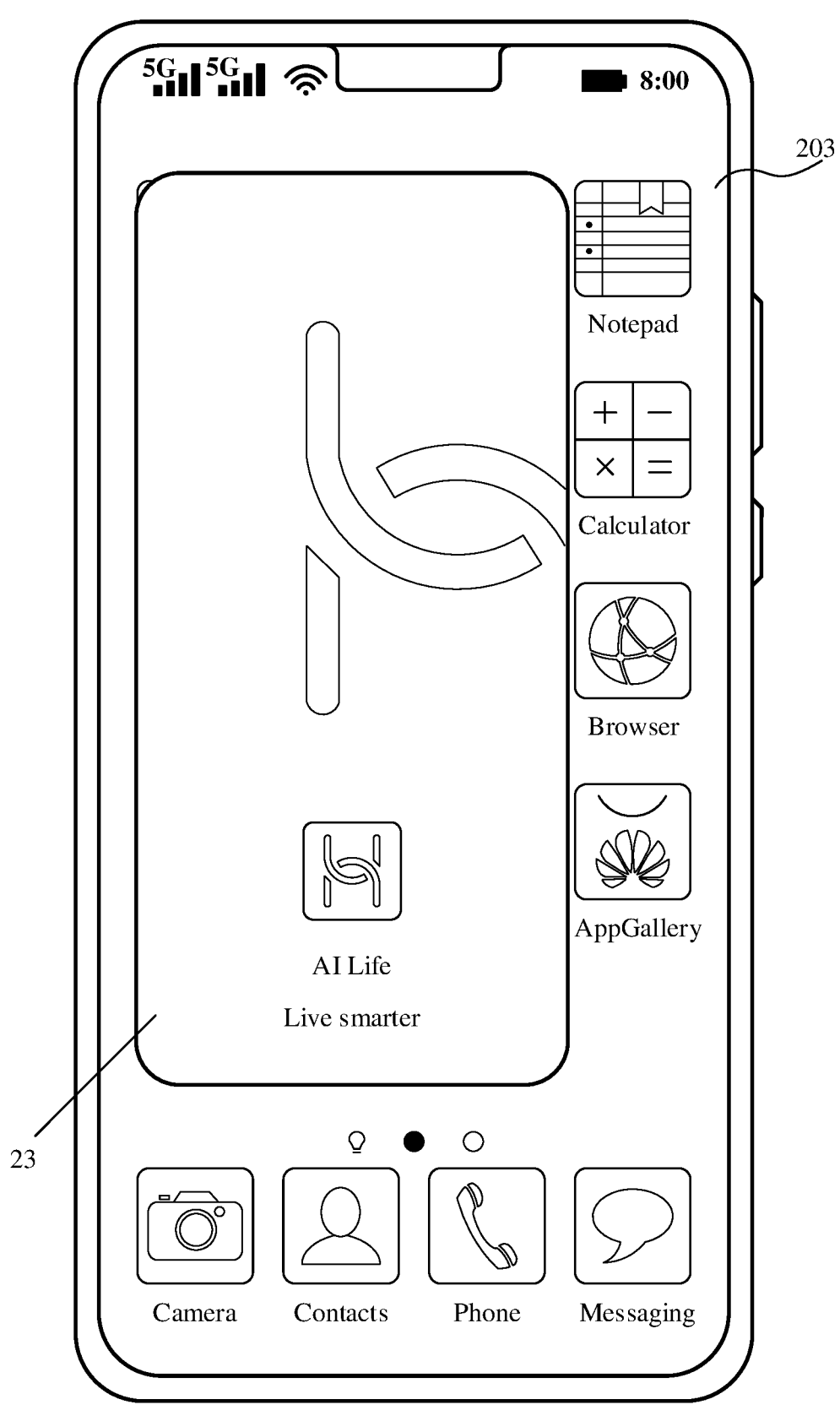
Figure 2D:
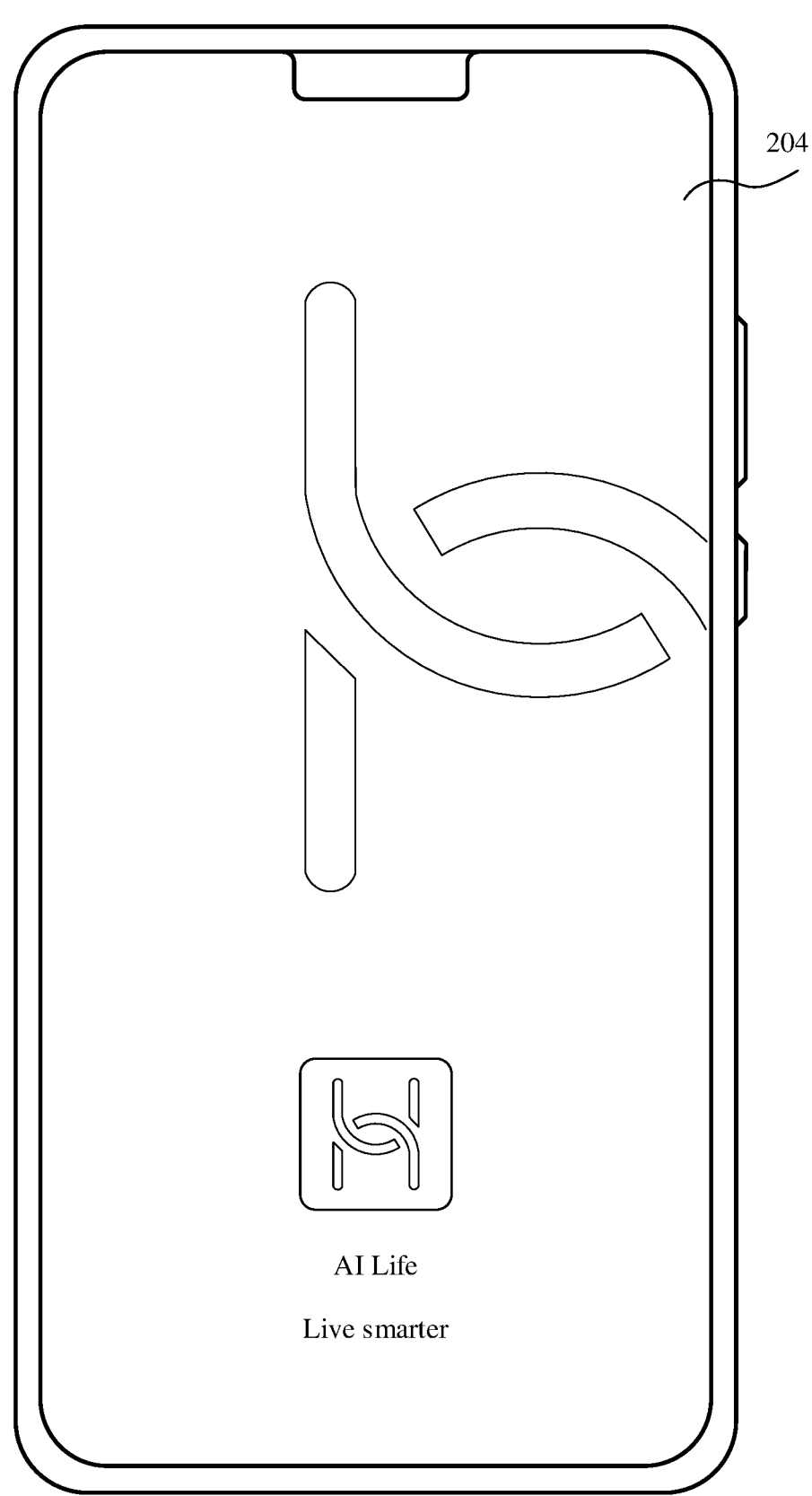
Figure 2E:
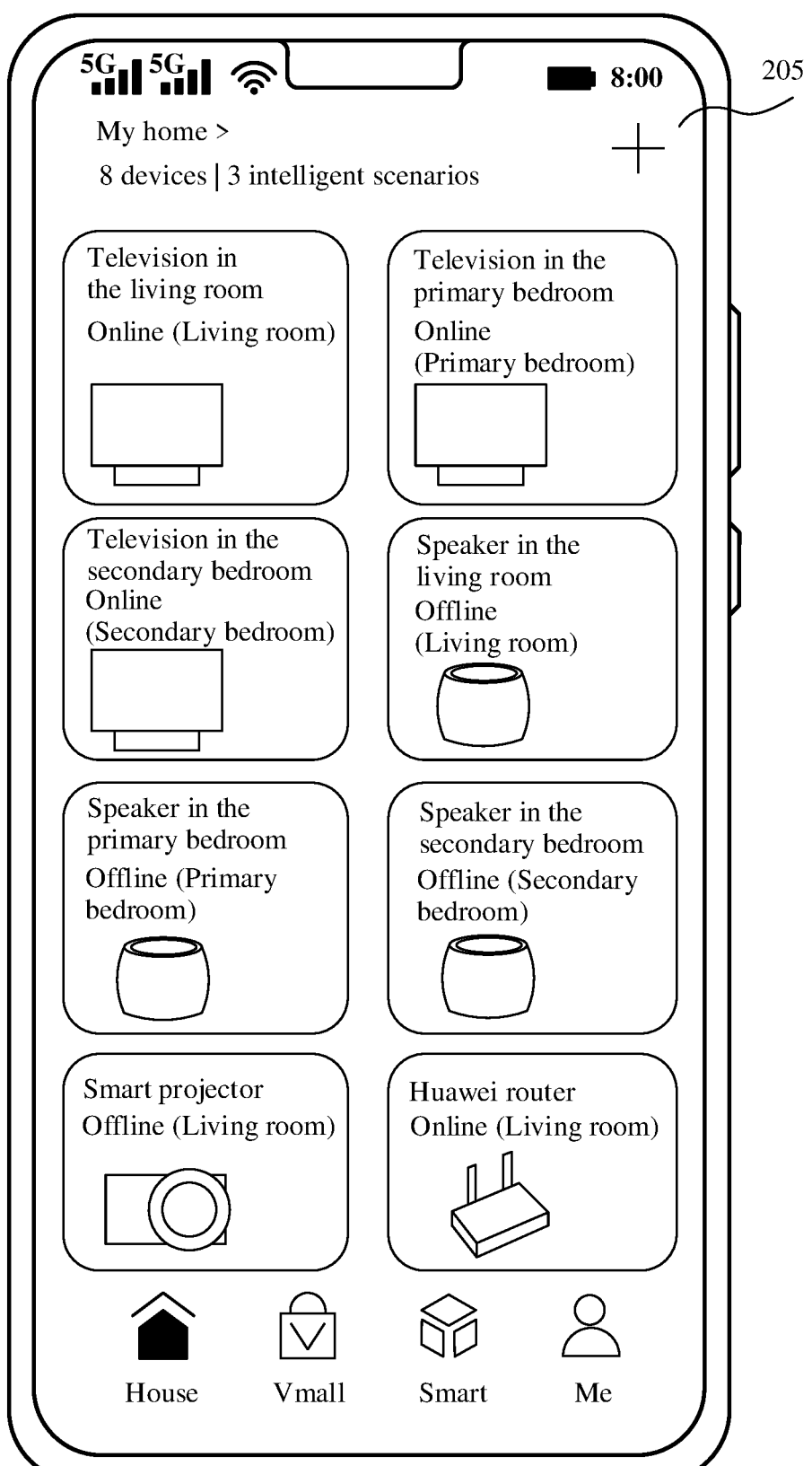

For example, it is assumed that an AI Life application uses the Starting Window mechanism and is configured with an image corresponding to a launch animation, for example, an interface 201 shown in FIG. 2(a). After detecting an operation of tapping an AI Life icon 21 by the user, the electronic device determines to launch the AI Life application, draws window content of a corresponding first display interface (that is, a main interface of the AI Life), and starts to display the launch animation. The launch animation includes an icon animation that is at a specific moment in a process in which an icon is zoomed in and that is indicated by a reference numeral 22 in an interface 202 shown in FIG. 2(b), and a window animation that is corresponding to a preset image at a specific moment in a process in which the preset image is zoomed in and that is indicated by a reference numeral 23 in an interface 203 shown in FIG. 2(c). Then, on an interface 204 shown in FIG. 2(d), the electronic device displays the preset image until drawing of the window content of the first display interface is completed, and displays an interface 205 shown in FIG. 2(e), that is displays an AI Life main interface, to complete launch of the AI Life application.

Figure 3:
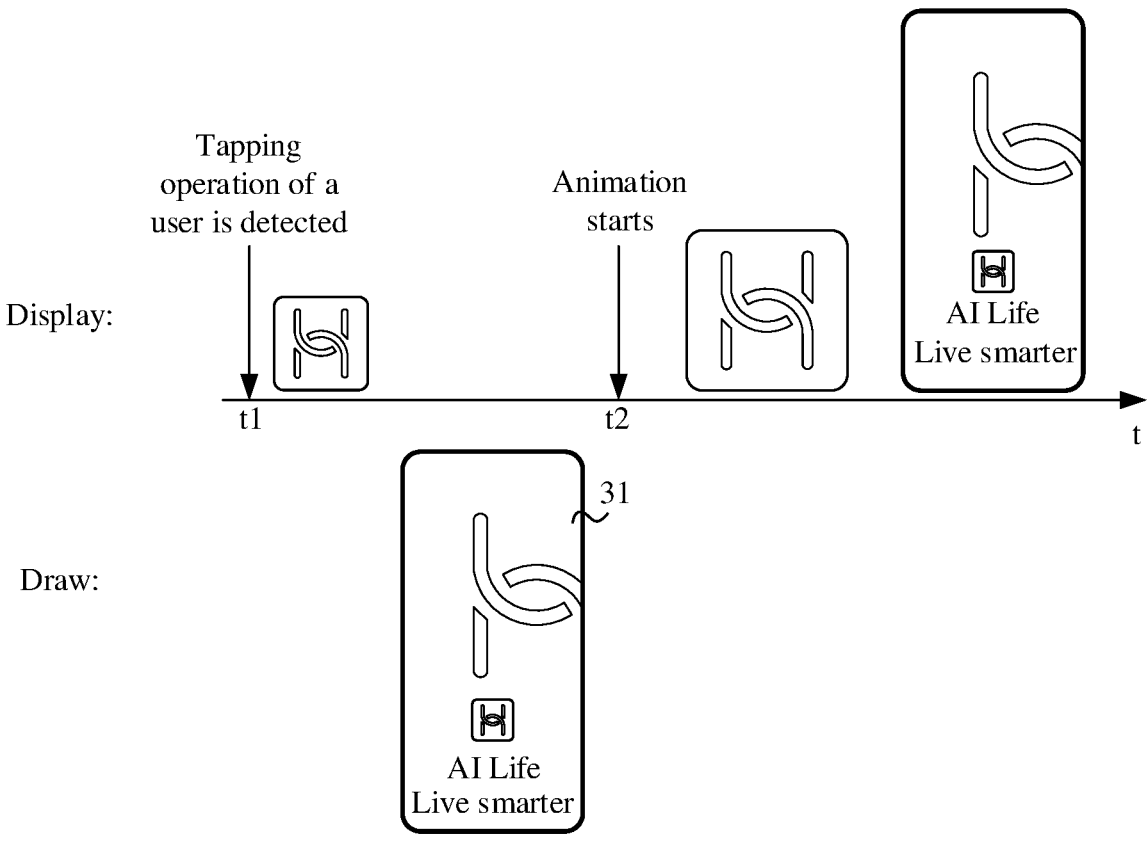
FIG. 3 is a schematic diagram 1 of a principle of an application launch animation in a Starting Window mechanism according to an embodiment.

In the foregoing Starting Window mechanism, because the preset image is large and data information corresponding to the preset image is usually stored in the electronic device, when the launch animation needs to be displayed, the data information is decoded and drawing of the preset image is completed by using the data information before the launch animation is displayed. Therefore, before the launch animation is displayed, the process of drawing the preset image also takes a specific time period, and consequently, the electronic device generates a specific application launch operation response delay. As shown in FIG. 3, after detecting, at a moment t1, the operation of tapping the application icon by the user, the electronic device draws the preset image 31 corresponding to the application in the background, and may start to display an animation (that is, the launch animation) only after drawing of the preset image 31 is completed at a moment t2. In a time period from t1 to t2, content displayed on the electronic device interface remains unchanged. In other words, a response delay is generated for the tapping operation of the user, which affects user experience. Corresponding to a scenario shown in FIG. 2(a) to FIG. 2(e), after detecting, on the interface 201 shown in FIG. 2(a), the operation of tapping the AI Life icon 21 by the user, the electronic device delays for a time period before starting to display the application icon animation displayed on the interface 202 shown in FIG. 2(b).

Based on this, embodiments of this disclosure provide a display method. Based on the Starting Window mechanism, in response to (or following) the application launch operation, the application icon animation is displayed in the process of drawing the preset image, to ensure that the application launch animation may start to be displayed right after the application launch operation is detected. This further reduces the response delay and improves user experience.

The following describes an electronic device provided in this disclosure.

For example, the electronic device 100 in embodiments of this disclosure may include but is not limited to a terminal device having a display function, for example, a mobile phone, a tablet computer, a wearable device, an in-vehicle device, a notebook computer, an ultra-mobile personal computer (UMPC), a netbook, a personal digital assistant (PDA), or an artificial intelligence device. For example, an operating system installed on the electronic device 100 includes, but is not limited to, iOS®, Android®, Harmony®, Windows®, Linux®, or another operating system. In some embodiments, the electronic device 100 may be a fixed device, or may be a portable device. A specific type of the electronic device 100 and the operating system installed on the electronic device 100 are not limited in this application.

Figure 4:
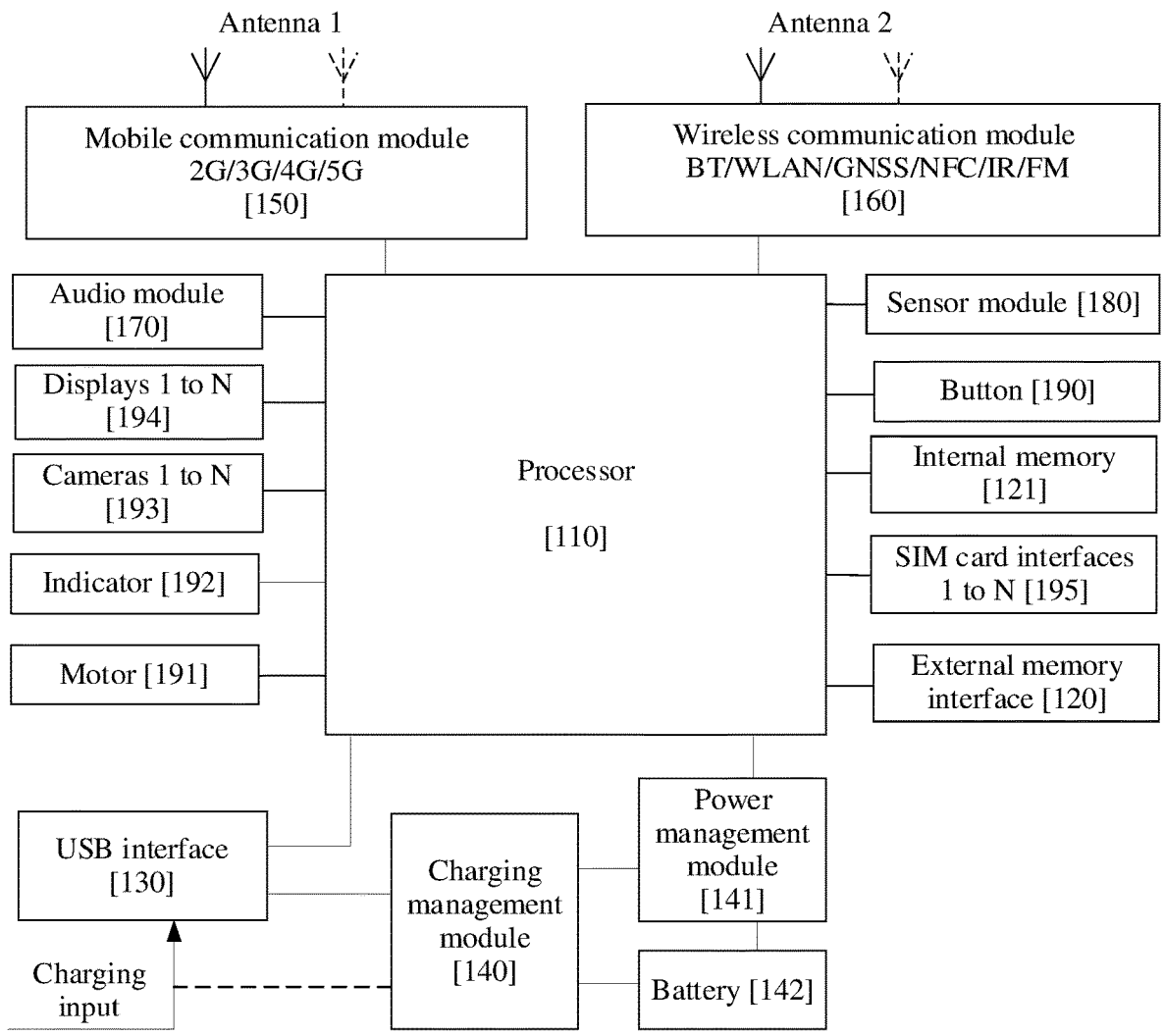
FIG. 4 is a schematic diagram of a hardware structure of an electronic device according to an embodiment.

For example, FIG. 4 is a schematic diagram of a structure of an electronic device 100 according to an embodiment of this disclosure.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a sensor module 180, a button 190, a motor 191, an indicator 192, a camera 193, a display 194, a subscriber identity module (SIM) card interface 195, and the like.

It may be understood that a structure illustrated in this embodiment constitutes no specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the processor may directly invoke the instructions or the data from the memory. This avoids repeated access, reduces a waiting time period of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, or the like.

The I2C interface is a two-way synchronization serial bus and includes a serial data line (SDA) and a serial clock line (SCL). In some embodiments, the processor 110 may include a plurality of groups of I2C buses. The processor 110 may be coupled to the touch sensor, a charger, a flash, the camera 193, and the like through different I2C bus interfaces. For example, the processor 110 may be coupled to the touch sensor through the I2C interface, so that the processor 110 communicates with the touch sensor through the I2C bus interface, to implement a touch function of the electronic device 100.

The MIPI interface may be configured to connect the processor 110 to a peripheral component like the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset to play audio through the headset. The interface may be further configured to connect to another electronic device like an AR device.

It may be understood that an interface connection relationship between the modules illustrated in this embodiment of this application is merely an example for description, and constitute no limitation on the structure of the electronic device 100. In some other embodiments, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antennas may be used in combination with a tuning switch.

The mobile communication module 150 may provide a solution applied to the electronic device 100 for wireless communication such as 2G/3G/4G/5G. The mobile communication module 150 may include at least one filter, a switch, a power amplifier, a low noise amplifier (LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device, or displays an image or a video by using a display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

The electronic device 100 may implement the display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194. N is a positive integer greater than 1.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 193. N is a positive integer greater than 1.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage region and a data storage region. The program storage region may store an operating system, an application required by at least one function (for example, a sound play function and an image play function), and the like. The data storage area may store data (such as audio data and an address book) and the like that are created during use of the electronic device 100. In addition, the internal memory 121 may include a high-speed random access memory, or may include a nonvolatile memory, for example, at least one magnetic disk storage device, a flash memory, or a universal flash storage (UFS). The processor 110 runs the instructions stored in the internal memory 121 and/or the instructions stored in the memory disposed in the processor, to perform various function applications and data processing of the electronic device 100.

The audio module 170 is configured to convert digital audio information into an analog audio signal for output, and is also configured to convert analog audio input into a digital audio signal. The audio module 170 may further be configured to encode and decode an audio signal. In some embodiments, the audio module 170 may be disposed in the processor 110, or some functional modules of the audio module 170 are disposed in the processor 110. The electronic device 100 may, for example, play music and record sounds by using the audio module 170. The audio module 170 may include a speaker, a receiver, a microphone, a headset jack, an application processor, and the like to implement an audio function.

The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

The pressure sensor is configured to sense a pressure signal, and may convert the pressure signal into an electrical signal. In some embodiments, the pressure sensor may be disposed on the display 194. There are many types of pressure sensors such as a resistive pressure sensor, an inductive pressure sensor, and a capacitive pressure sensor. The capacitive pressure sensor may include at least two parallel plates made of conductive materials. When a force is applied to the pressure sensor, capacitance between electrodes changes. The electronic device 100 determines pressure intensity based on a capacitance change. When a touch operation is performed on the display, the electronic device 100 detects intensity of the touch operation by using the pressure sensor. The electronic device 100 may also calculate a touch location based on a detection signal of the pressure sensor. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The touch sensor is also referred to as a "touch control device". The touch sensor may be disposed on the display 194, and the touch sensor and the display 194 form a touchscreen, which is also referred to as a "touch screen". The touch sensor is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor may alternatively be disposed on a surface of the electronic device 100, and is at a location different from that of the display 194.

In some embodiments, an application icon is displayed on the display 194 of the electronic device 100. After detecting, by using the touch sensor, an operation of tapping the application icon, the electronic device 100 determines that the application needs to be launched. Then, whether the application is configured with a Starting Window mechanism is determined. If the application is configured with the Starting Window mechanism, that is, the application is configured with a preset image for a launch animation, the preset image is drawn and an icon animation is displayed. After drawing of the preset image is completed, a window animation corresponding to the preset image is displayed. After the launch animation of the application is displayed, a main interface of the application is displayed.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and indicates a charging status and a power change, or indicates a message, a missed call, a notification, and the like.

The SIM card interface 195 is configured to connect to a SIM card. The SIM card may be inserted into the SIM card interface 195 or withdrawn from the SIM card interface 195, to implement contact with or separation from the electronic device 100. The electronic device 100 may support one or N SIM card interfaces. N is a positive integer greater than 1.

A software system of the electronic device 100 may use a layered architecture, an event-driven architecture, a micro-kernel architecture, a microservice architecture, or a cloud architecture. In an embodiment of this application, an Android system of a layered architecture is used as an example to illustrate a software structure of the electronic device 100.

Figure 5:
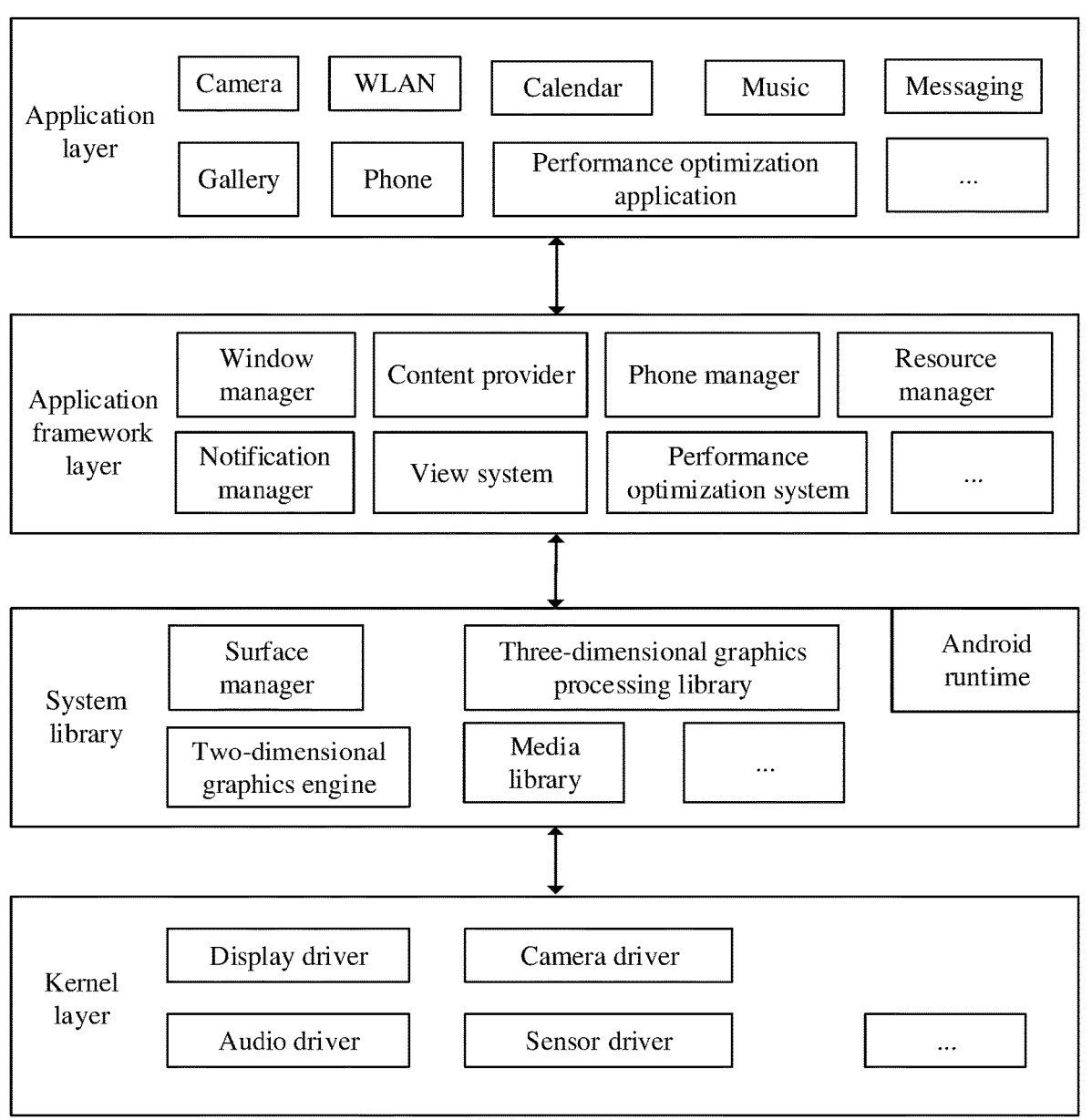
FIG. 5 is a schematic block diagram of a software structure of an electronic device according to an embodiment.

For example, FIG. 5 is a schematic block diagram of a software structure of an electronic device 100 according to an embodiment of this application.

In a layered architecture, software is divided into several layers, and each layer has a clear role and task. The layers communicate with each other through a software interface. In some embodiments, a system is divided into four layers: an application layer, an application framework layer, a runtime and system library, and a kernel layer from top to bottom.

The application layer may include a series of application packages.

As shown in FIG. 5, the application packages may include applications such as Camera, Gallery, Calendar, Phone, Map, Navigation, WLAN, Bluetooth, Music, Video, and Messaging.

The application layer may further include a performance optimization application. The performance optimization application may provide a visualized interface or view, or may not provide a visualized interface or view. When the electronic device is launched, the performance optimization application may be automatically launched without an operation of the user. The performance optimization application may include, for example, an iAware, and the performance optimization application may be used to record whether the application is configured with the Starting Window mechanism. For example, a table is used to record a configuration status of a Starting Window mechanism and identify an application configured with the Starting Window mechanism. Subsequently, after detecting an application launch operation, the electronic device determines, by using recorded content in the performance optimization application, whether the application carries an identifier corresponding to the Starting Window mechanism, to determine whether a Starting Window image needs to be drawn.

The application framework layer provides an application programming interface (API) and a programming framework for an application at the application layer. The application framework layer includes some predefined functions.

As shown in FIG. 5, the application framework layer may include a window manager, a content provider, a view system, a phone manager, a resource manager, a notification manager, a local profile assistant (LPA), and the like.

A window manager is configured to manage a window program. The window manager may obtain a size of a display, determine whether there is a status bar, perform screen locking, take a screenshot, and the like.

In some embodiments, the window manager may provide a window manager service (WMS), and the WMS may initiate a process of adding and drawing a Starting Window.

The content provider is configured to store and obtain data, and enable the data to be accessed by an application. The data may include a video, an image, audio, calls that are made and received, a browsing history, a bookmark, an address book, and the like.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, provide a message notification, and the like. The notification manager may alternatively be a notification that appears in a top status bar of the system in a form of a graph or scroll bar text, for example, a notification of an application running in the background, or may be a notification that appears on a screen in a form of a dialog interface. For example, text information is displayed in the status bar, a prompt tone is made, the electronic device vibrates, or the indicator light flashes.

The view system includes visual controls such as a control for displaying a text and a control for displaying a picture. The view system may be used to construct an application. A display interface may include one or more views. For example, a display interface including an SMS message notification icon may include a view for displaying text and a view for displaying a picture.

The application framework layer may further include a performance optimization system, and the performance optimization system may store a configuration status of the Starting Window mechanism and a Starting Window display policy. After the application is launched, the performance optimization system may be accessed by using the performance optimization application, to determine whether the launched application is configured with the Starting Window mechanism and determine an adopted Starting Window display policy. The Starting Window display policy includes, for example, displaying an icon animation in a process of drawing the Starting Window. After drawing of the Starting Window is completed, a Starting Window animation is displayed.

The runtime includes a core library and a virtual machine. The runtime is responsible for scheduling and management of the Android system.

The kernel library includes two parts: a function that needs to be called in Java language and a kernel library.

The application layer and the application framework layer run on the virtual machine. The virtual machine executes Java files of the application layer and the application framework layer as binary files. The virtual machine is configured to implement functions such as object lifecycle management, stack management, thread management, security and abnormality management, and garbage collection.

The system library may include a plurality of functional modules, such as a surface manager, a media library, a three-dimensional graphics processing library (for example, OpenGL ES), and a two-dimensional graphics engine (for example, SGL).

The surface manager is configured to manage a display subsystem and provide a fusion of two-dimensional (2D) and three-dimensional (3D) layers for a plurality of applications.

The media library supports playing and recording of a plurality of commonly used audio and video formats, static image files, and the like. The media library may support a plurality of audio and video encoding formats such as MPEG-4, H.264, MP3, AAC, AMR, JPG, and PNG.

The three-dimensional graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and a virtual card driver.

Figure 6:
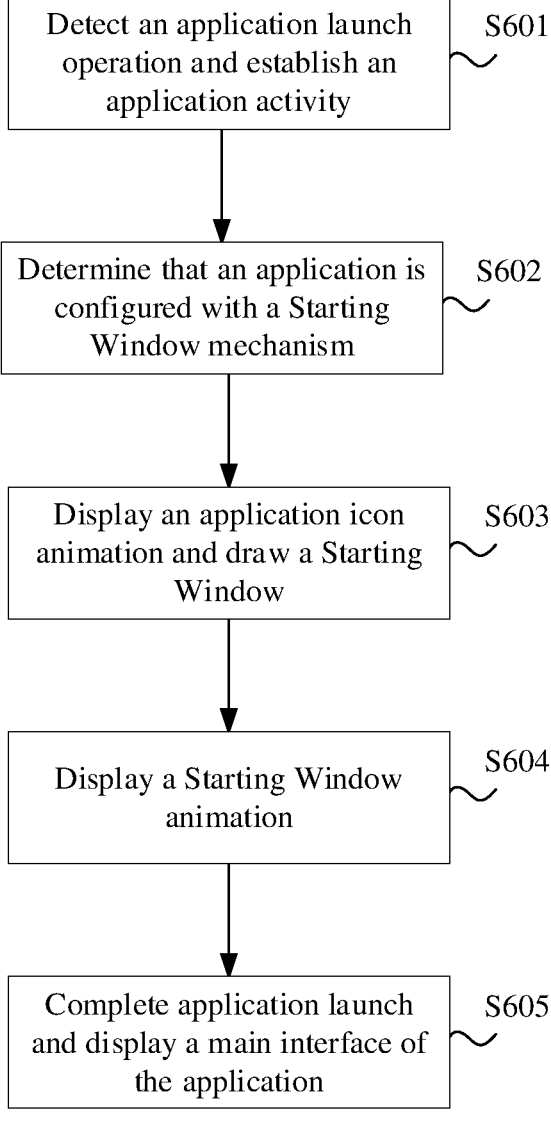
FIG. 6 is a flowchart 1 of a display method according to an embodiment.

For example, FIG. 6 is a schematic diagram of a display method according to an embodiment of this application. The method may be applied to an electronic device. As shown in FIG. 6, the method may include S601 to S605.

S601: Detect an application launch operation, and establish an application activity.

The application launch operation includes, for example, an operation of tapping by a user on an application icon displayed on a display of the electronic device, an operation of launching an application by using a voice, and the like. An activity (activity) is one of basic components of an Android operating system, and may be used to provide an interactive interface or view for a user in an application. One application may include a plurality of activities, and the application loads an activity by using a task stack. An activity at the top of the task stack is an activity with which the user may directly interact. An activity has a life cycle. An activity manager service (AMS) provided by an operating system may be used to monitor a life cycle of an activity of a running application. For example, the electronic device determines a start state and a pause state of the activity by using the AMS.

Figure 7A:
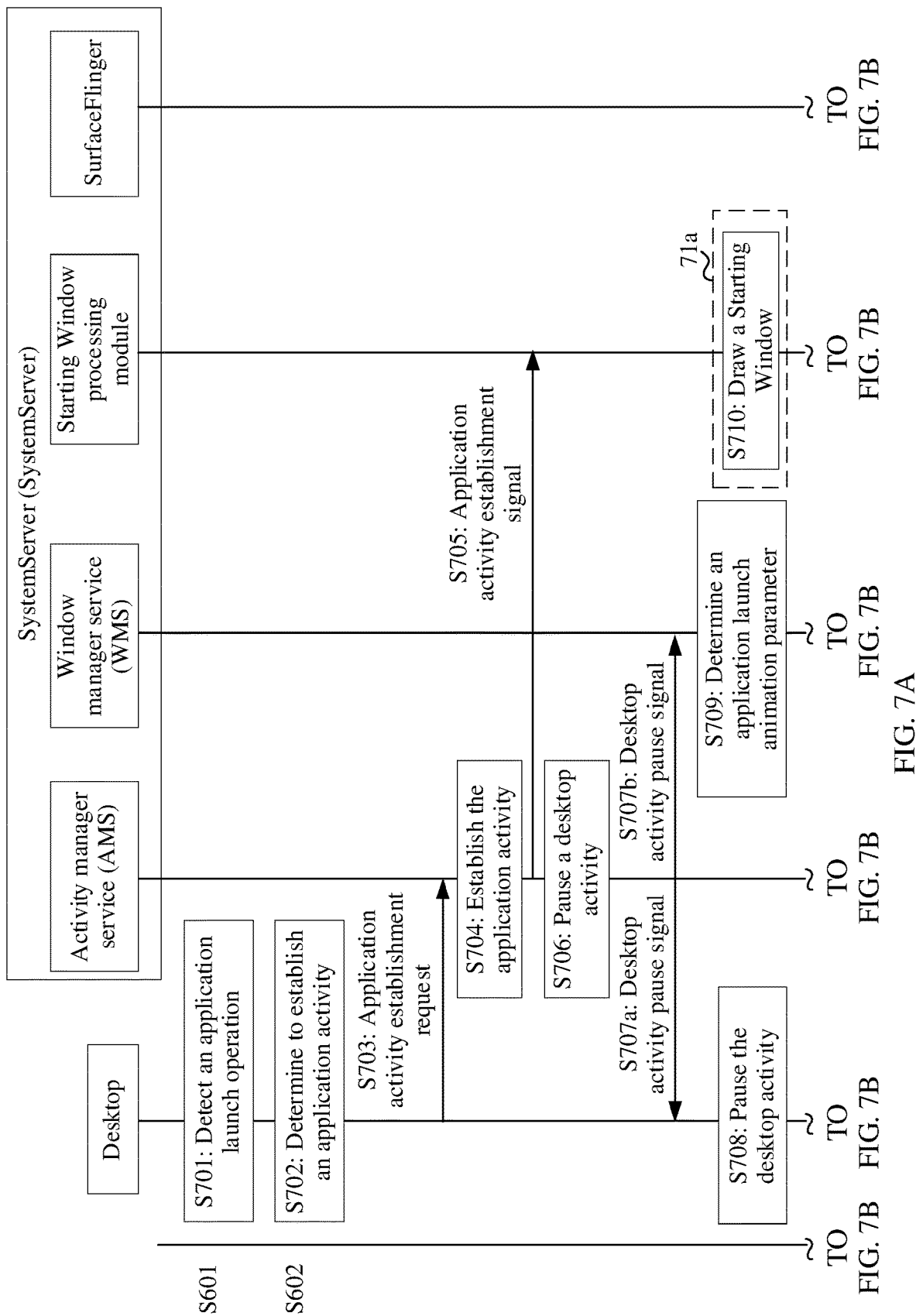
FIG. 7A and FIG. 7B are a flowchart 2 of a display method according to an embodiment.
Figure 7B:
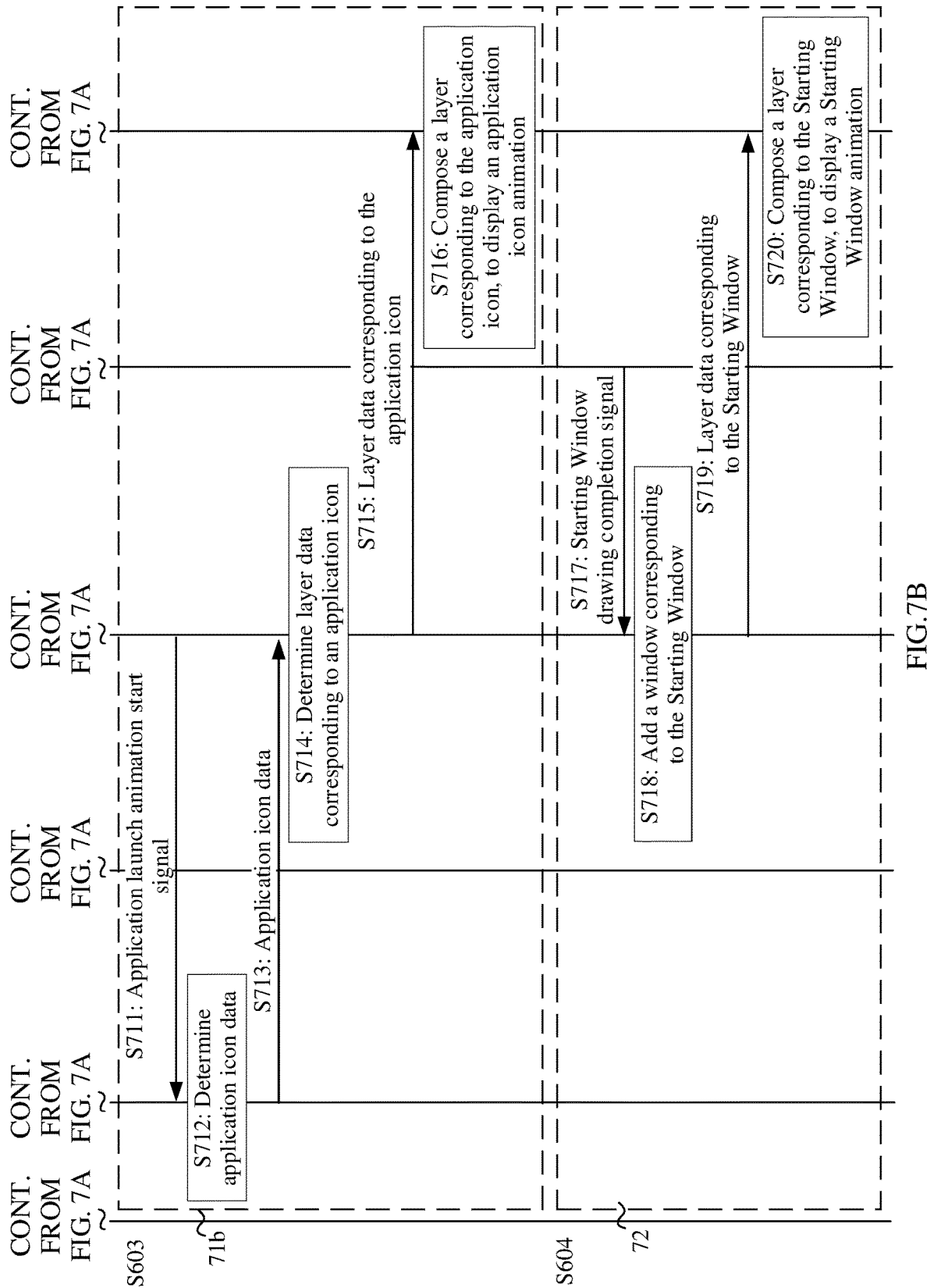

In some embodiments, after detecting the application launch operation (for example, an operation of tapping an application icon by a user), the electronic device determines to launch a corresponding application, pauses an activity corresponding to a desktop, and establishes an activity of the application corresponding to the application icon. FIG. 7A and FIG. 7B are a schematic flowchart of a display method implemented by internal module interaction of an electronic device according to an embodiment of this application. As shown in FIG. 7A, S601 may be specifically implemented as any one step or a combination of a plurality of steps in S701 to S708.

S701: The desktop detects the application launch operation.

S702: The desktop determines to establish the application activity.

S703: The desktop sends an application activity establishment request to the AMS.

For example, in S701 to S703, a SystemServer (System-Server) includes at least an AMS, a WMS, a Starting Window processing module, and a SurfaceFlinger. After detecting the operation of tapping the application icon by the user, the desktop side determines that the corresponding application needs to be launched, determines that an activity corresponding to the application needs to be established, and sends the activity establishment request to the SystemServer, for example, sends a StartActivity message to the AMS.

In some embodiments, in the method procedure shown in FIG. 7A and FIG. 7B, a launch animation is displayed by using interaction between a desktop process and a System-Server process. The desktop process is a process invoked by the desktop, and the SystemServer process is a process invoked by a module (for example, the AMS, the WMS, the Starting Window processing module, or the SurfaceFlinger) in the SystemServer. The desktop process communicates with the SystemServer process in an inter-process communication (inter-process communication, IPC) manner. The inter-process communication manner includes, for example, a binder manner. For example, the desktop process sends the StartActivity message to the SystemServer process in a binder IPC manner.

S704: The AMS establishes the application activity.

S705: The desktop sends an application activity establishment signal to the Starting Window processing module.

S706: The AMS pauses a desktop activity.

S707a: The AMS sends a desktop activity pause signal to the desktop.

S707b: The AMS sends the desktop activity pause signal to the WMS.

For example, in S704 to S707b, after receiving the application activity establishment request, the AMS establishes the activity corresponding to the application. In addition, it is determined that an activity that is corresponding to the desktop and that is running on a current display interface should be paused, so that the desktop loses a focus, to display an application launch animation. After the desktop activity is paused, the AMS sends the desktop activity pause signal to the desktop, to indicate the desktop to temporarily pause the desktop activity. In addition, the AMS sends the desktop activity pause signal to the WMS, to trigger the WMS to start to prepare for an application launch animation transition, for example, to determine an application launch animation parameter. In addition, the AMS sends the application activity establishment signal to the Starting Window processing module for triggering the Starting Window processing module to obtain Starting Window data to draw a Starting Window.

It should be noted that an execution sequence of S704 to S707b is not specifically limited in this embodiment of this application. For example, after receiving the application activity establishment request, the AMS first performs S704 to establish the application activity, and after the application activity is established, performs S705 to send the application activity establishment signal to the Starting Window processing module. Then, S706 is performed to pause the desktop activity. After the desktop activity is paused, S707a and S707b are performed to send the desktop activity pause signal to the desktop and the WMS separately. The AMS may simultaneously perform S707a and S707b, or may perform S707a before S707b, or may perform S707b before S707a. For another example, after receiving the application activity establishment request, the AMS first performs S706 to pause the desktop activity, then performs S704 to establish the application activity, and finally performs S705, S707a, and S707b to send the desktop activity pause signal and the application activity establishment signal.

S708: The desktop pauses the desktop activity.

For example, after receiving the desktop activity pause signal, the desktop pauses the desktop activity. For example, the desktop process receives, in the binder IPC manner, an ActivityPaused message sent by the SystemServer process, and the desktop pauses the desktop activity based on the ActivityPaused message, and starts to display an application icon animation.

In this way, the electronic device establishes the application activity in response to the application launch operation, and then obtains and displays the launch animation.

S602: Determine that the application is configured with a Starting Window mechanism.

In some embodiments, after determining that the application launch animation needs to be displayed, the electronic device needs to determine whether the application is configured with the Starting Window mechanism, to determine whether a response delay caused by drawing the Starting Window in an application launch process needs to be improved.

It should be noted that whether the application is configured with the Starting Window mechanism and preset image information corresponding to the Starting Window are determined by an application developer and are preset in the application. Some or all of applications in the electronic device are configured with the Starting Window mechanism. This is not specifically limited in this embodiment.

Figure 8:
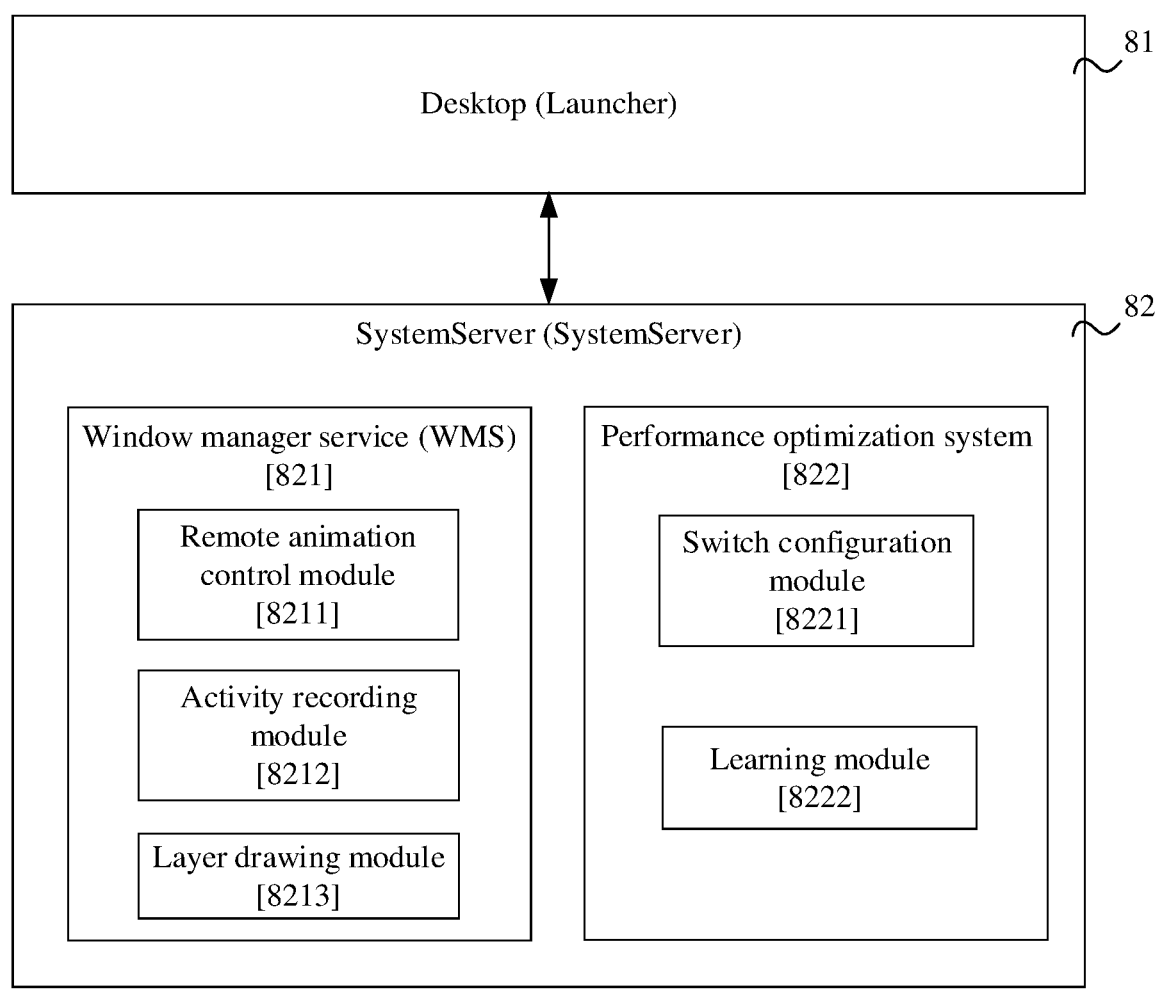
FIG. 8 is a schematic diagram of module interaction applied in a display method according to an embodiment.

For example, as shown in FIG. 8, after detecting the application launch operation, the desktop (for example, a launcher) 81 sends the application launch operation to the SystemServer 82. The SystemServer 82 includes a window manager service (WMS) 821 and a performance optimization system 822. A remote animation control module 8211 in the WMS 821 obtains the StartActivity message, and determines that the application launch animation needs to be executed. The electronic device determines, by using a switch configuration module 8221 in the performance optimization system 822, whether the application launch animation is enabled. If the application launch animation is enabled, it is determined that the application launch animation is allowed to be displayed in the application launch process. Then, the electronic device queries, by using an activity recording module 8212 in the WMS 821, an application Starting Window identifier recorded in a learning module 8222 in the performance optimization system 822, to determine whether the to-be-launched application is configured with the Starting Window mechanism, and whether an image corresponding to the Starting Window is preset. For example, the learning module 8222 stores the following Table 1, and the following Table 1 records an identifier indicating whether an application installed in the electronic device is configured with the Starting Window mechanism. If the to-be-launched application is an application 1, the activity recording module 8212 queries the following Table 1 stored in the learning module 8222, and determines that the application 1 has the Starting Window identifier, and determines that a launch animation of the application 1 includes a Starting Window animation.

TABLE 1

| Application name | Starting Window identifier |
|---|---|
| Application 1 | Yes |
| Application 2 | No |
| Application 3 | Yes |

S603: Display the application icon animation and draw the Starting Window.

In some embodiments, after determining that the application is configured with the Starting Window mechanism, the electronic device needs to determine the application launch animation parameter, to perform transitional preparation for subsequent launch animation displaying. The application launch animation parameter includes an attribute parameter corresponding to data required by an application launch animation. As shown in S709 in FIG. 7A, the electronic device determines the application launch animation parameter by using the WMS.

For example, as shown in FIG. 8, after obtaining the StartActivity message by using the remote animation control module 8211, the WMS 821 determines that the transitional preparation for an application launch animation needs to be performed. The transitional preparation includes, for example, determining the application launch animation parameter. The application launch animation parameter includes, for example, attribute parameters of the application launch animation, such as an animation type and an animation parameter. The animation parameter includes a location, a size, a shape, and the like corresponding to control data in an animation process. For example, the WMS determines that animations of the application icon and the Starting Window are that the application and the Starting Window are gradually zoomed in for display, and determines that the application icon is zoomed in to a preset size before connecting to the Starting Window animation. In a connecting process, the application icon fades out and the Starting Window fades in, and the application icon and the Starting Window are superimposed to form a related parameter corresponding to the Starting Window animation and the like.

Optionally, as shown in FIG. 8, the WMS 821 may obtain the StartActivity message by using the remote animation control module 8211, so that the WMS does not need to determine the application launch animation parameter after receiving the desktop activity pause signal. In other words, as shown in FIG. 7A, S709 may be performed after S707*b*, or may be performed before S707*b*; or S707*b* is an optional step, and the AMS does not need to send the desktop activity pause signal to the WMS.

In some embodiments, after determining the application launch animation parameter by using the WMS, the electronic device determines that the application launch animation includes two phases of animation: A phase 1 animation displays the application icon animation, and a phase 2 animation displays the Starting Window animation. In S603, the application icon needs to be displayed (that is, the phase 1 animation is displayed), and in a process of displaying the phase 1 animation, the Starting Window is drawn for preparing the phase 2 animation.

Optionally, S603 may be specifically implemented as any one step or a combination of a plurality of steps in S710 to S716 shown in FIG. 7A and FIG. 7B.

S710: The Starting Window processing module draws the Starting Window.

In some embodiments, in S705, after receiving the application activity establishment signal, the Starting Window processing module obtains a Starting Window data packet corresponding to the to-be-launched application, and decompresses the data packet, to obtain preset related data for drawing the Starting Window.

For example, to use less storage space, the electronic device usually does not store the image corresponding to the Starting Window in a memory. When it is determined that the Starting Window needs to be displayed, the electronic device needs to first draw the Starting Window based on the preset related data.

In some other embodiments, in S705, after receiving the application activity establishment signal, the Starting Window processing module directly obtains the preset Starting Window image in the electronic device and completes the drawing of the Starting Window.

In some embodiments, in a process in which the Starting Window processing module draws the Starting Window, the electronic device performs the following S711 to S716, that is, draws the Starting Window and displays the application icon animation in parallel.

S711: The WMS sends the application launch animation start signal to the desktop.

In some embodiments, after determining the application launch animation parameter in S709, the WMS determines that the application icon animation may start to be displayed, and sends the application launch animation start signal to the desktop, to obtain application icon data. For example, the SystemServer process sends the StartAnimation message to the desktop process in the binder IPC manner, to indicate the desktop to start to display the application launch animation.

S712: The desktop determines the application icon data.

S713: The desktop sends the application icon data to the WMS.

In some embodiments, in S712 and S713, the desktop displays the application icon. In this case, after receiving the application launch animation start signal, the desktop may obtain application icon data corresponding to the application icon, and send the application icon data to the WMS, to generate a layer corresponding to the application icon, so that the application icon animation is displayed. Correspondingly, the WMS receives the application icon data sent by the desktop.

S714: The WMS determines layer data corresponding to the application icon.

S715: The WMS sends the layer data corresponding to the application icon to the SurfaceFlinger.

In some embodiments, in S714 and S715, after receiving the application icon data, the WMS determines a window corresponding to the application icon, generates, by using the application icon data and the corresponding window, the layer data corresponding to the application icon, and sends the layer data corresponding to the application icon to the SurfaceFlinger for composition, to obtain an animation visible to the user. Correspondingly, the SurfaceFlinger receives the layer data that is corresponding to the application icon and that is sent by the WMS.

For example, as shown in FIG. 8, by using a layer drawing module 8213, the WMS 821 obtains the layer data after processing the application icon data that is received, to complete the drawing of the layer corresponding to the application icon.

S716: The SurfaceFlinger composes the layer corresponding to the application icon, to display the application icon animation.

In some embodiments, the SurfaceFlinger invokes a composition thread and performs layer composition on the received layer data corresponding to the application icon, to obtain a corresponding image frame. The electronic device may receive, by using a liquid crystal display (liquid crystal display, LCD) panel drive, a composed image frame, and the LCD displays the composed image frame. After the image frame is displayed on the LCD, the image displayed on the LCD may be perceived by human eyes.

Figure 9A:
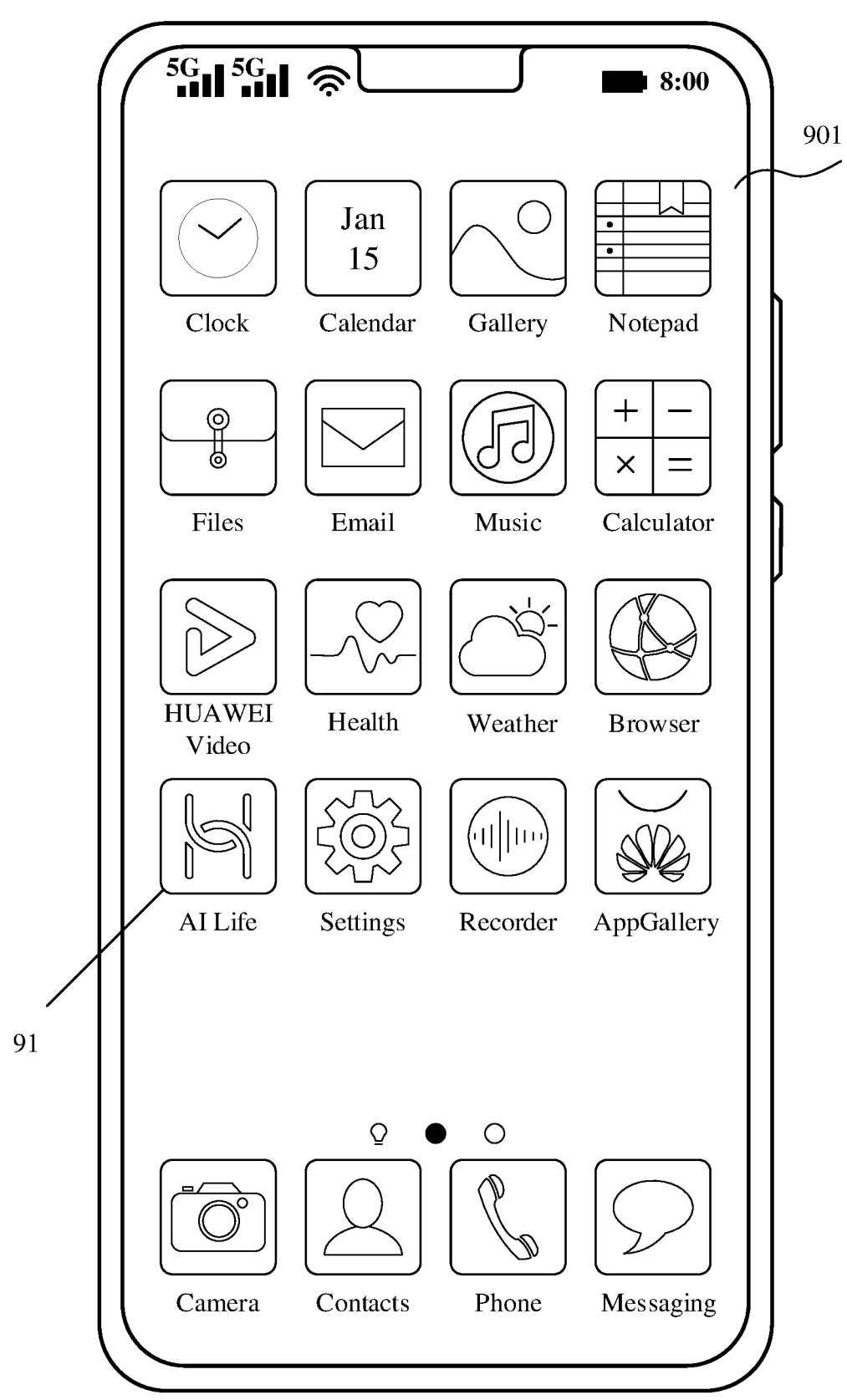
FIG. 9(a) to FIG. 9(d) are a schematic diagram 3 of an interface according to an embodiment.
Figure 9B:
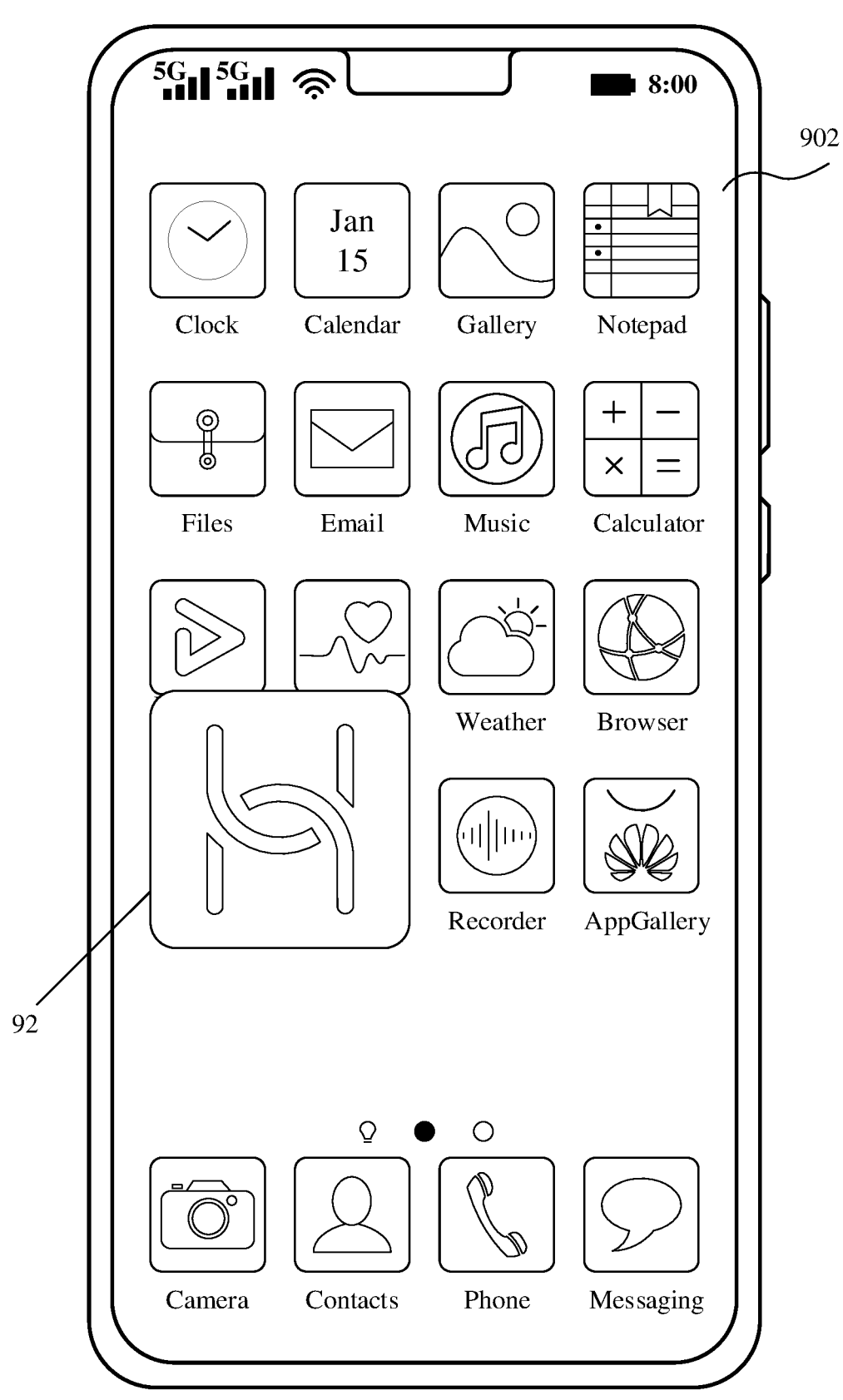
Figure 9C:
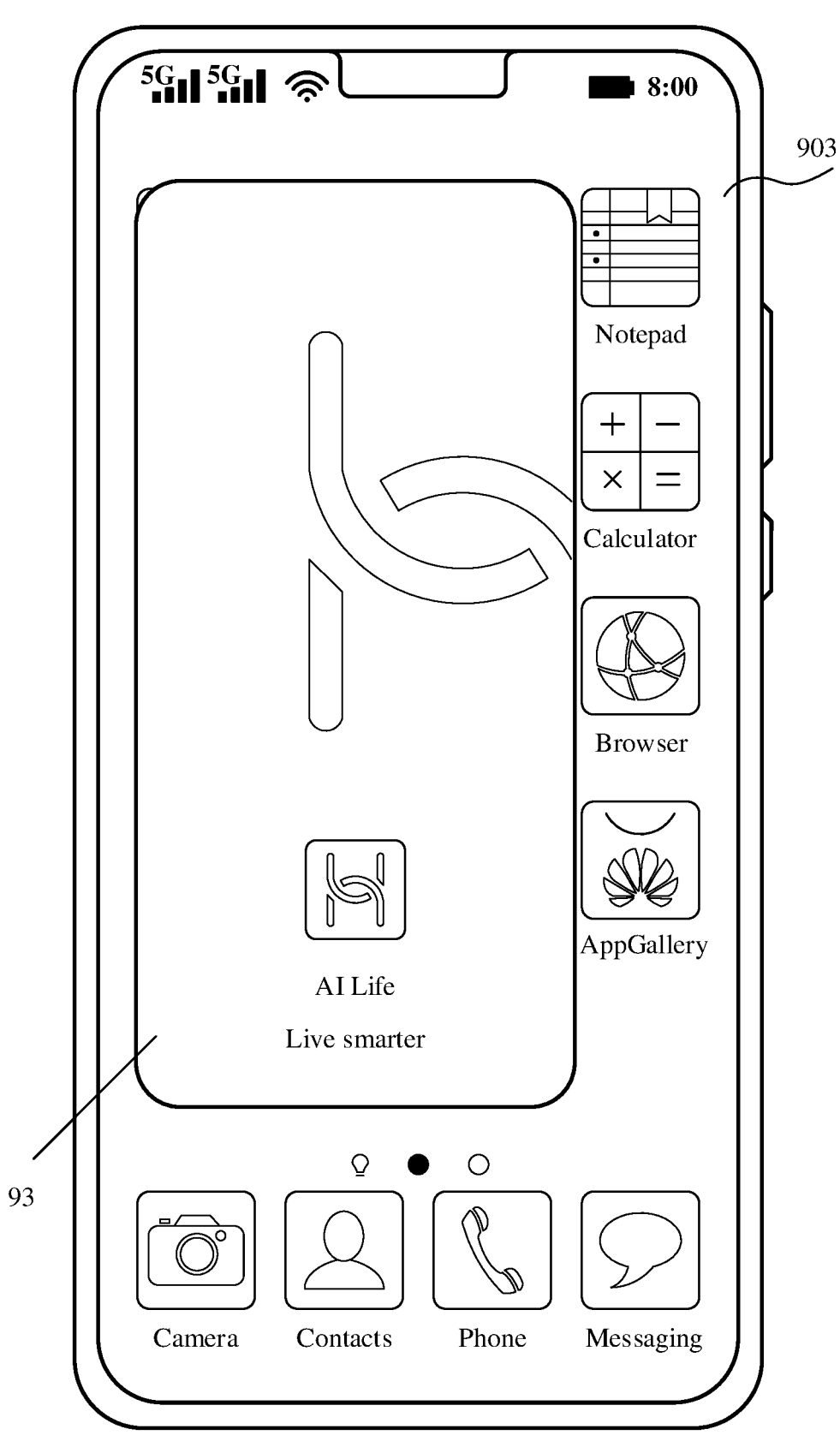

For example, on an interface 901 shown in FIG. 9(a), after detecting an operation of tapping an AI Life application icon 91 by the user, the electronic device pauses the desktop activity by using the desktop, establishes the application activity, and displays the phase 1 animation corresponding to the application icon animation. A zoomed-in icon indicated by a reference numeral 92 in an interface 902 shown in FIG. 9(b) is the application icon display effect at a specific moment in the phase 1 animation.

In other words, the electronic device completes, by performing S711 to S716, the composition of the image frame corresponding to the application icon animation. Then, the electronic device may display the application icon animation, that is, the electronic device displays the phase 1 animation in the application launch process.

As shown in FIG. 7A and FIG. 7B, steps of drawing the Starting Window in a dashed line box indicated by a reference numeral 71a are parallel to a phase 1 animation process in a dashed line box indicated by a reference numeral 71b. For example, corresponding to a scenario of launching the AI Life application shown in FIG. 9(a) to FIG. 9(d), as shown in FIG. 10, after detecting a tapping operation of the user, the electronic device starts the phase 1 animation display process, and draws the Starting Window in parallel in the background.

Figure 10:
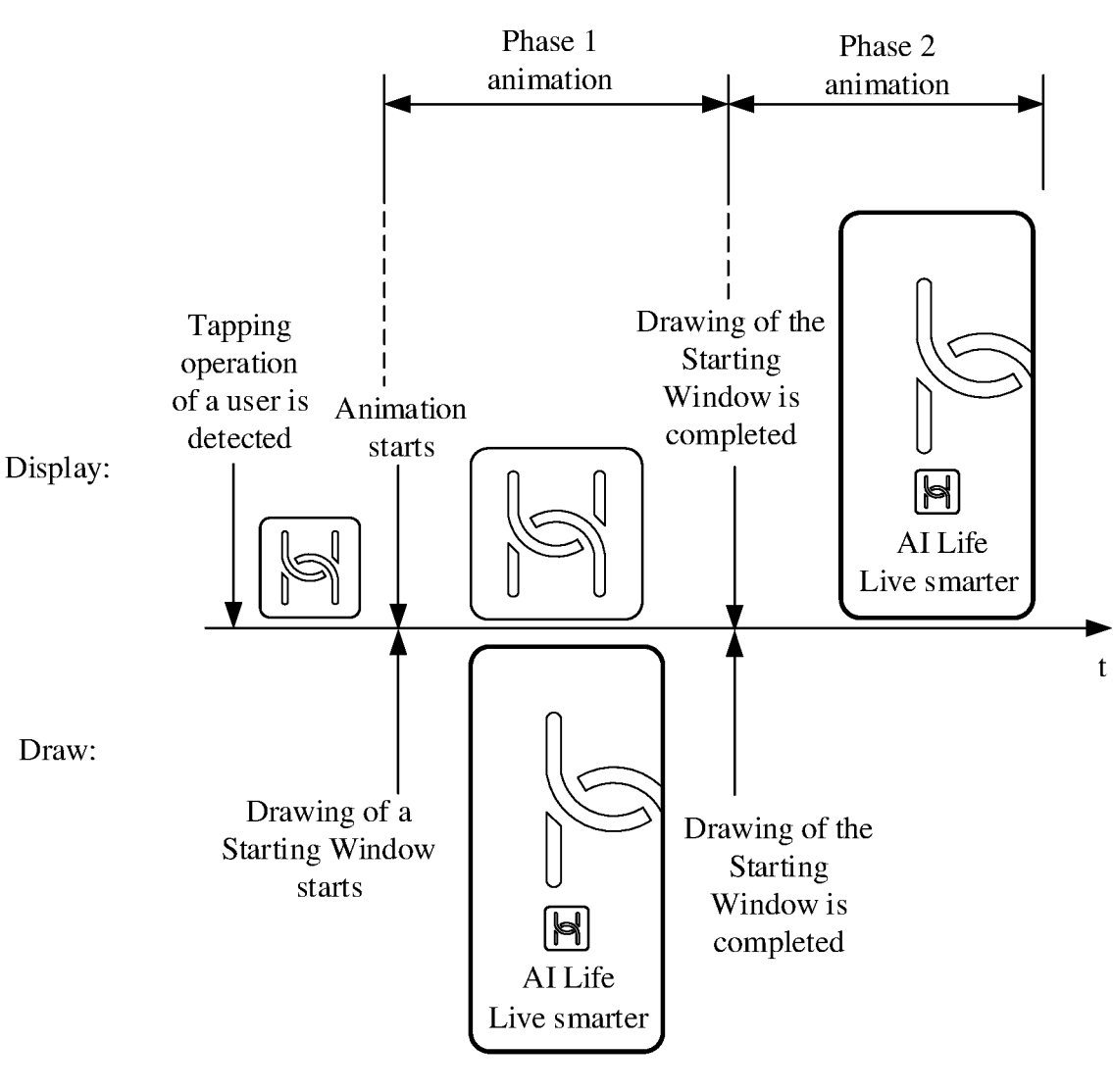
FIG. 10 is a schematic diagram 2 of a principle of an application launch animation in a Starting Window mechanism according to an embodiment.

In this way, compared with a procedure shown in FIG. 3, as shown in FIG. 10, after detecting the application launch operation of the user, the electronic device does not generate a Starting Window drawing delay (that is, a waiting time period from t1 to t2), and may directly display the application icon animation (that is, the phase 1 animation). This reduces user operation response delay and improves user experience.

In some scenarios, the image preset for application by the developer is complex or contains a large quantity of content. As a result, it takes a long time to draw the Starting Window. If the electronic device starts to display the application icon animation right after detecting the application launch operation, and stops displaying the application icon animation only after the drawing of the Starting Window is completed, a display time period of the application icon animation is long, which affects user experience. Therefore, a waiting time period for displaying the application icon animation is preset, and the preset waiting time period for displaying the application icon animation is less than the drawing time period of the Starting Window, to ensure that the application icon animation may start to be displayed before drawing of the Starting Window is completed. Based on this, after detecting the application launch operation, the electronic device starts to display the application icon animation after waiting for the preset waiting time period for displaying the application icon animation. In addition, after detecting the application launch operation, the electronic device starts to draw the Starting Window. In this way, the electronic device reduces the waiting time period for drawing the Starting Window, and prevents the user from watching the application icon animation for a long time period. This improves user experience.

S604: Display the Starting Window animation.

In some embodiments, the electronic device draws the Starting Window in S603. After drawing of the Starting Window is completed, the electronic device starts to display the phase 2 animation after the phase 1 animation ends, that is, starts to display the Starting Window animation. Optionally, in the phase 2 animation, the electronic device displays the animation after superimposing the application icon and the Starting Window. Display effects include a fade-out display effect of the application icon and a fade-in display effect of the Starting Window, so that smoothness of connecting the phase 1 animation and the phase 2 animation is ensured.

Optionally, as shown in FIG. 7B, S604 may be specifically implemented as any one step or a combination of a plurality of steps in S717 to S720.

S717: The Starting Window processing module sends a Starting Window drawing completion signal to the WMS.

In some embodiments, in S710, the Starting Window processing module draws the Starting Window, and after drawing of the Starting Window is completed, the Starting Window processing module sends the Starting Window drawing completion signal to the WMS, to indicate that the WMS may start to display the Starting Window animation. Correspondingly, the WMS receives the Starting Window drawing completion signal sent by the Starting Window processing module.

S718: The WMS adds a window corresponding to the Starting Window.

In some embodiments, after receiving the Starting Window drawing completion signal, the WMS adds the window corresponding to the Starting Window, and generates layer data corresponding to the Starting Window.

For example, as shown in FIG. 8, by using the layer drawing module 8213, the WMS 821 obtains the layer data corresponding to the Starting Window after processing the Starting Window data received, to complete the drawing of the layer corresponding to the application Starting Window.

S719: The WMS sends the layer data corresponding to the Starting Window to the SurfaceFlinger.

S720: The SurfaceFlinger composes the layer corresponding to the Starting Window to display the Starting Window animation.

In some embodiments, in S719 and S720, the WMS sends the layer data obtained by the drawn Starting Window to the SurfaceFlinger. The SurfaceFlinger invokes the composition thread to perform layer composition on the received layer data corresponding to the Starting Window, to obtain a corresponding image frame. The electronic device may receive, by using the LCD driver, the composed image frame, and the LCD displays the composed image frame visible to the user, that is, displays the Starting Window animation.

For example, on the interface 902 shown in FIG. 9(b), after determining that the drawing of Starting Window is completed, the electronic device ends, based on the application launch animation parameter determined in S709, display of the application icon animation (a phase 1 animation generation process shown in the dashed-line box indicated by the reference numeral 71b in FIG. 7B) and starts to display the Starting Window animation (a phase 2 animation generation process shown in a dashed-line box indicated by a reference numeral 72 in FIG. 7B). As shown in FIG. 10, after drawing of the Starting Window is completed, Starting Window is added to the launch animation, to start to display the phase 2 animation. This process is a process in which the application icon and the Starting Window are superimposed and zoomed in for display. Correspondingly, on an interface 903 shown in FIG. 9(c), the electronic device displays a Starting Window animation visible to the user, and the Starting Window indicated by a reference numeral 93 is a display effect at a specific moment in a process of displaying the Starting Window animation.

S605: Complete the application launch and display a main interface of the application.

In some embodiments, after detecting the application launch operation in S601, the electronic device starts to draw the main interface of the application. The main interface is an interface corresponding to a first image frame to be displayed after the application launch animation. After determining that drawing and composing of the main interface are completed, the electronic device may end display of the launch animation, start to display the main interface of the application, and complete the application launch process. In other words, in a process of drawing the main interface, the application icon animation and the Starting Window animation are displayed. This avoids a user operation response delay caused by waiting for the main interface to be drawn.

Figure 9D:
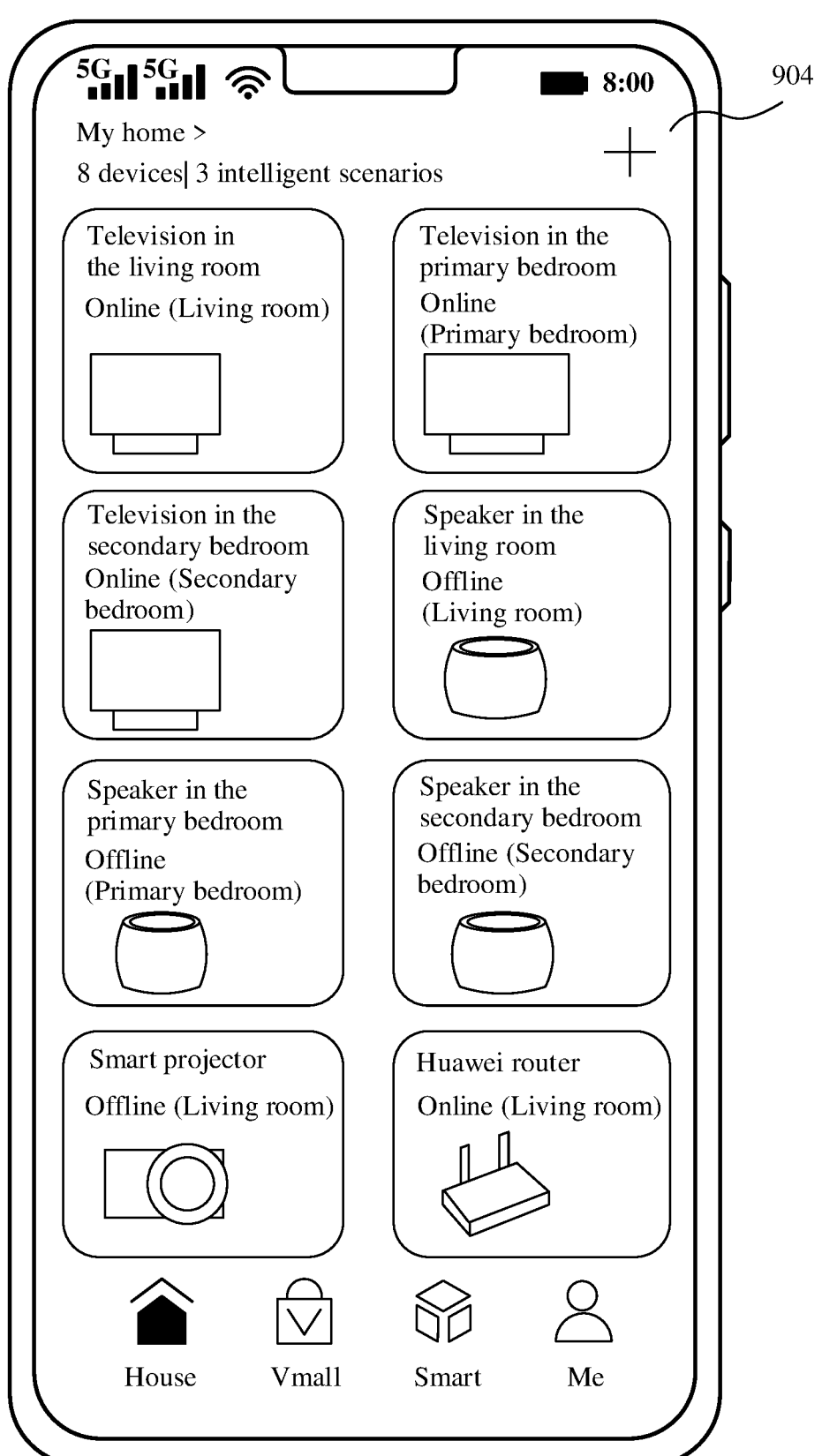

For example, on an interface 904 shown in FIG. 9(d), after determining that drawing and composing of an image frame corresponding to the interface 904 are completed, the electronic device ends the phase 2 animation, displays a composed image frame of the main interface, and determines that the application launch is completed.

It can be learned that, in the scenario shown in FIG. 9(a) to FIG. 9(d), after detecting the application launch operation of the user, the electronic device may display for the user the application icon animation shown in the interface 902 and the Starting Window animation shown in the interface 903. After the application launch animation ends, the electronic device may display the main interface of the application shown in the interface 904, to complete the application launch. In this way, in the application launch process, the electronic device has no response delay to a user operation. This effectively improves user experience.

The foregoing describes in detail the display method provided in embodiments of this application with reference to FIG. 6 to FIG. 10. The following describes in detail the display apparatus provided in embodiments of this application with reference to FIG. 11.

Figure 11:
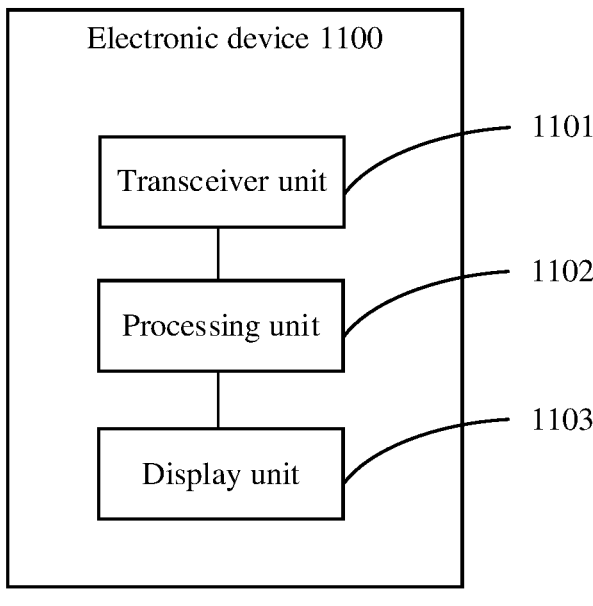
FIG. 11 is a schematic diagram of a structure of an electronic device according to an embodiment.

In a possible design, FIG. 11 is a schematic diagram of a structure of an electronic device according to an embodiment of this application. As shown in FIG. 11, the electronic device 1100 may include a transceiver unit 1101, a processing unit 1102, and a display unit 1103. The electronic device 1100 may be configured to implement functions of the electronic device in the foregoing method embodiments.

Optionally, the transceiver unit 1101 is configured to support the electronic device 1100 in performing S601 in FIG. 6, and/or support the electronic device 1100 in performing S701 in FIG. 7A.

Optionally, the processing unit 1102 is configured to support the electronic device 1100 in performing S602 and S603 in FIG. 6, and/or support the electronic device 1100 in performing S702 to S720 in FIG. 7A and FIG. 7B.

Optionally, the display unit 1103 is configured to support the electronic device 1100 in displaying interface content, and/or support the electronic device 1100 in performing S603, S604, and S605 in FIG. 6.

The transceiver unit may include a receiving unit and a sending unit, may be implemented by a transceiver or a transceiver-related circuit component, and may be a transceiver or a transceiver module. Operations and/or functions of the units in the electronic device 1100 are separately intended to implement corresponding procedures of the display method in the foregoing method embodiments. All related content of the steps in the foregoing method embodiments may be cited in function descriptions of corresponding functional units. For brevity, details are not described herein again.

Optionally, the electronic device 1100 shown in FIG. 11 may further include a storage unit (not shown in FIG. 11), and the storage unit stores a program or instructions. When the processing unit 1102 and the transceiver unit 1101 execute the program or the instructions, the electronic device 1100 shown in FIG. 11 may perform the display method in the foregoing method embodiments.

For technical effects of the electronic device 1100 shown in FIG. 11, refer to technical effects of the display method in the foregoing method embodiments. Details are not described herein again.

In addition to a form of the electronic device 1100, the technical solutions provided in this application may also be a functional unit or a chip in the electronic device, or an apparatus that matches the electronic device.

An embodiment of this disclosure further provides a chip system including a processor. The processor is coupled to a memory, the memory is configured to store a program or instructions, and when the program or the instructions is/are executed by the processor, the chip system is enabled to implement the method in any one of the foregoing method embodiments.

Optionally, there may be one or more processors in the chip system. The processor may be implemented by hardware or software. When being implemented by hardware, the processor may be a logic circuit, an integrated circuit, or the like. When being implemented by software, the processor may be a general-purpose processor, and is implemented by reading software code stored in the memory.

Optionally, there may also be one or more memories in the chip system. The memory may be integrated with the processor, or may be disposed separately from the processor. This is not limited in embodiments of this application. For example, the memory may be a non-transitory processor, for example, a read-only memory ROM. The memory and the processor may be integrated on a same chip, or may be separately disposed on different chips. A type of the memory and a manner of setting the memory and the processor are not specifically limited in embodiments of this application.

For example, the chip system may be a field programmable gate array (FPGA), an application-specific integrated circuit (ASIC), a system on chip (SoC), a central processing unit (CPU), a network processor (NP), a digital signal processor (DSP), a microcontroller unit (MCU), a programmable logic device (PLD), or another integrated chip.

It should be understood that steps in the foregoing method embodiments may be implemented by using a hardware integrated logical circuit in the processor, or by using instructions in a form of software. The steps of the methods disclosed with reference to embodiments of this application may be directly performed by a hardware processor, or may be performed by a combination of hardware and software modules in the processor.

An embodiment of this disclosure further provides a computer readable storage medium. The computer readable storage medium stores a computer program. When the computer program is run on a computer, the computer is enabled to perform the foregoing related steps, to implement the display method in the foregoing embodiments.

An embodiment of this disclosure further provides a computer program product. When the computer program product is run on a computer, the computer is enabled to perform the foregoing related steps, to implement the display method in the foregoing embodiments.

In addition, an embodiment of this disclosure further provides an apparatus. The apparatus may be specifically a component or a module, and the apparatus may include one or more processors and memories that are connected to each other. The memory is configured to store a computer program. When the computer program is executed by one or more processors, the apparatus is enabled to perform the display method in the foregoing method embodiments.

The apparatus, the computer readable storage medium, the computer program product, or the chip provided in embodiments of this disclosure are all configured to perform the corresponding method provided above. Therefore, for beneficial effects that can be achieved, refer to the beneficial effects in the corresponding method provided above. Details are not described herein.

Methods or algorithm steps described in combination with the content disclosed in embodiments of this disclosure may be implemented by hardware, or may be implemented by a processor by executing software instructions. The software instructions may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to the processor, so that the processor may read information from the storage medium and write information into the storage medium. Certainly, the storage medium may be a component of the processor. The processor and the storage medium may be located in an application-specific integrated circuit (ASIC).

The foregoing descriptions about implementations allow a person skilled in the art to understand that, for the purpose of convenient and brief description, division into the foregoing functional modules is taken as an example for illustration. In actual application, the foregoing functions may be allocated to different functional modules and implemented based on requirements. In other words, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this disclosure, it should be understood that the disclosed methods may be implemented in other manners. The foregoing described apparatus embodiments are merely examples. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in electronic, mechanical, or other forms.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software functional unit.

The computer readable storage medium includes but is not limited to any one of the following: any medium that can store program code, for example, a USB flash drive, a removable hard disk, a read-only memory (ROM), a random access memory (RAM), a magnetic disk, or an optical disc.

The foregoing descriptions are merely specific implementations and are not intended to limit the protection scope of this disclosure. Any variation or replacement within the technical scope disclosed in this specification shall fall within the protection scope of the claims.

What is claimed is:

1. A display method, comprising:
receiving, by an electronic device, an application launch instruction;
displaying, by the electronic device, an icon animation corresponding to the application;
drawing, by the electronic device, a starting window corresponding to the application, wherein the icon animation starts to be displayed prior to completion of drawing of the starting window; and
following completion of drawing of the starting window, displaying a starting window animation corresponding to the application;
wherein, during the icon animation, the application icon is zoomed in to a preset size before connecting to the starting window animation and fades out and the starting window fades in.

2. The method according to claim 1, further comprising:
determining, by the electronic device, that the application is configured with a starting window mechanism.

3. The method according to claim 1, wherein the displaying an icon animation corresponding to the application and drawing a starting window corresponding to the application comprises:
obtaining, by the electronic device, icon data of the application using a window manager service;
displaying, by the electronic device based on the icon data, the icon animation corresponding to the application;
obtaining, by the electronic device, a starting window data packet by using a starting window processing module; and
drawing, by the electronic device, the starting window based on the starting window data packet.

4. The method according to claim 1, further comprising:
drawing, by the electronic device, a main interface corresponding to the application; and
displaying, by the electronic device, the main interface.

5. The method according to claim 1, wherein the application launch instruction comprises an instruction corresponding to an operation of tapping an icon of the application on a display of the electronic device or processing a voice instruction received by the electronic device.

6. The method according to claim 1, wherein the icon animation comprises enlarging the icon.

7. An electronic device, comprising:
a processor;
a memory coupled to the processor and storing program instructions; and
a display coupled to the processor, wherein the program instructions, when executed by the processor, cause the electronic device to:
receive an application launch instruction;
display on the electronic device display an icon animation corresponding to the application and drawing a starting window corresponding to the application, wherein the icon animation starts to be displayed prior to completion of drawing of the starting window; and following completion of drawing of the starting window, displaying a starting window animation corresponding to the application;

wherein, during the icon animation, the application icon is zoomed in to a preset size before connecting to the starting window animation and fades out and the starting window fades in.

8. The electronic device according to claim 7, wherein execution of the instructions by the processor further cause the electronic device to:

determine that the application is configured with a starting window mechanism.

9. The electronic device according to claim 7, wherein execution of the instructions by the processor cause the electronic device to:

obtain icon data of the application using a window manager service and displaying, based on the icon data, the icon animation corresponding to the application; and obtain a starting window data packet using a starting window processing module and drawing the starting window based on the starting window data packet.

10. The electronic device according to claim 7, wherein execution of the instructions by the processor further cause the electronic device to:

draw a main interface corresponding to the application; and display the main interface.

11. The electronic device according to claim 7, wherein the application launch instruction comprises an instruction corresponding to an operation of tapping an icon of the application on the electronic device display or processing a voice instruction received by the electronic device.

12. The electronic device according to claim 7, wherein the icon animation comprises enlarging the icon.

13. A non-transitory computer readable medium comprising program instructions that, when executed by a processor, cause the processor to:

receive an application launch instruction;

display an icon animation corresponding to the application and draw a starting window corresponding to the application, wherein the icon animation starts to be displayed prior to completion of drawing of the starting window; and following completion of the drawing of the starting window, display a starting window animation corresponding to the application;

wherein, during the icon animation, the application icon is zoomed in to a preset size before connecting to the starting window animation and fades out and the starting window fades in.

14. The non-transitory readable medium according to claim 13, wherein the program instructions further cause the processor to:

determine that the application is configured with a starting window mechanism.

15. The non-transitory readable medium according to claim 13, wherein the program instructions cause the processor to:

obtain icon data of the application using a window manager service and displaying, based on the icon data, the icon animation corresponding to the application; and obtain a starting window data packet using a starting window processing module and drawing the starting window based on the starting window data packet.

16. The non-transitory readable medium according to claim 13, wherein the program instruction further cause the processor to:

draw a main interface corresponding to the application; and display the main interface.

17. The non-transitory readable medium according to claim 13, wherein the application launch instruction comprises an instruction corresponding to an operation of tapping an icon of the application on a display of the electronic device or processing a voice instruction received by the electronic device.

18. The non-transitory readable medium according to claim 13, wherein the icon animation comprises enlarging the icon.

* * * * *